(12) United States Patent
Kasravi et al.

(10) Patent No.: US 7,966,212 B2
(45) Date of Patent: Jun. 21, 2011

(54) QUANTITATIVE ALIGNMENT OF BUSINESS OFFERINGS WITH THE EXPECTATIONS OF A BUSINESS PROSPECT

(75) Inventors: Kas Kasravi, West Bloomfield, MI (US); Corey W. Wick, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 957 days.

(21) Appl. No.: 11/851,258

(22) Filed: Sep. 6, 2007

(65) Prior Publication Data

US 2009/0070160 A1    Mar. 12, 2009

(51) Int. Cl.
G06Q 10/00    (2006.01)
(52) U.S. Cl. ............... 705/7.32; 705/7.29; 705/7.31
(58) Field of Classification Search ......... 705/7.11–7.42
See application file for complete search history.

(56) References Cited

U.S. PATENT DOCUMENTS

| | | | |
|---|---|---|---|
| 5,991,734 A | 11/1999 | Moulson | 705/10 |
| 6,375,470 B1 | 4/2002 | Rohan | 434/236 |
| 7,103,561 B1 | 9/2006 | Sarkisian et al. | 705/10 |
| 7,197,508 B1* | 3/2007 | Brown, III | 707/721 |
| 7,730,002 B2* | 6/2010 | Afeyan et al. | 706/13 |
| 7,885,849 B2* | 2/2011 | Gross | 1/1 |
| 7,890,363 B2* | 2/2011 | Gross | 705/7.31 |
| 2001/0027455 A1* | 10/2001 | Abulleil et al. | 707/102 |
| 2002/0016727 A1* | 2/2002 | Harrell et al. | 705/7 |
| 2003/0088458 A1* | 5/2003 | Afeyan et al. | 705/10 |
| 2003/0177055 A1* | 9/2003 | Zimmerman et al. | 705/10 |
| 2004/0054545 A1* | 3/2004 | Knight | 705/1 |
| 2004/0064358 A1 | 4/2004 | Hill et al. | 705/10 |
| 2004/0122686 A1* | 6/2004 | Hill et al. | 705/1 |
| 2004/0162751 A1* | 8/2004 | Tsyganskiy et al. | 705/10 |
| 2004/0204980 A1* | 10/2004 | Swedberg et al. | 705/10 |
| 2004/0230464 A1* | 11/2004 | Bliss et al. | 705/7 |
| 2005/0049908 A2 | 3/2005 | Hawks | 705/10 |
| 2005/0283394 A1* | 12/2005 | McGloin et al. | 705/10 |
| 2007/0241944 A1* | 10/2007 | Coldren et al. | 341/50 |
| 2008/0133316 A1* | 6/2008 | Sarkar | 705/10 |

OTHER PUBLICATIONS

Higgins, Susan H., & Shanklin, William L.. (1992). Seeking Mass Market Acceptance for High-Technology Consumer. The Journal of Consumer Marketing, 9(1), 5. Retrieved Sep. 22, 2010, from ABI/INFORM Global. (Document ID: 575808).*

Avlonitis, George J., and Pauline Papastathopoulou. "The Development Activities of Innovative and Non-Innovative New Retail Financial Products: Implications for Success." Journal of Marketing Management 17, No. 7/8 (Sep. 2001): 705-738. Business Source Complete, EBSCOhost (accessed Sep. 23, 2010).*

(Continued)

Primary Examiner — Lynda C Jasmin
Assistant Examiner — Alan Miller

(57) ABSTRACT

In certain embodiments, a method for quantitative alignment of business offerings with the expectations of a business prospect includes accessing a novelty indicator for an offering, the novelty indicator being based on one or more characteristics of the offering and rating an innovation level of the offering. The method further includes accessing an innovation perception indicator for a prospect of the offering, the innovation perception indicator providing an indication of how the prospect views innovation. The method further includes comparing the novelty indicator for the offering with the innovation perception indicator for the prospect to determine if the offering is aligned with the expectations of the prospect. In certain embodiments, the method includes generating a recommendation, possibly in the form of a report, based on the comparison of the novelty indicator for the offering and the innovation perception indicator for the prospect.

18 Claims, 11 Drawing Sheets

OTHER PUBLICATIONS

Flight, R.. Innovation characteristics and their influence on the rate of diffusion. Ph.D. dissertation, The University of Alabama, United States—Alabama, 2007. Retrieved Sep. 22, 2010, from Dissertations & Theses: Full Text.(Publication No. AAT 3313713).*

Chockalingam Viswesvaran. (2000). Innovations in Computerized Assessment [review of Fritz Drasgow and Julie B. Olson-Buchanan (Editors). Innovations in Computerized Assessment. Mahwah, NJ: Lawrence Erlbaum Associates, 1999]. Personnel Psychology, 53(1), 260-263. Retrieved Sep. 23, 2010, from ABI/INFORM Global. (Document ID: 51646086).*

Jana Bowden, & David Corkindale. (2005). Identifying the initial target consumer for innovations: an integrative approach. Marketing Intelligence & Planning, 23(6/7), 562-573. Retrieved Sep. 23, 2010, from ABI/INFORM Global. (Document ID: 950429781).*

Alpert, Frank. (1994). Innovator buying behavior over time: The innovator buying cycle and the cumulative effects of innovations. The Journal of Product and Brand Management, 3(2), 50. Retrieved Sep. 22, 2010, from ABI/INFORM Global. (Document ID: 880203).*

Hauser, John, Gerard J. Tellis, and Abbie Griffin. "Research on Innovation: A Review and Agenda for Marketing Science." Marketing Science 25, No. 6 (Nov. 2006): 687-717. Business Source Complete, EBSCOhost (accessed Sep. 23, 2010).*

Robertson, Thomas S. "Marketing's Potential Contribution to Consumer Behavior Research: The Case of Diffusion Theory." Advances in Consumer Research 11, No. 1 (Jan. 1984): 484-489. Business Source Complete, EBSCOhost (accessed Sep. 23, 2010).*

Lyman E. Ostlund, "Perceived Innovation Attributes as Predictors of Innovativeness." The Journal of Consumer Research vol. 1, No. 2 (The University of Chicago Press: Sep. 1974), pp. 23-29. (Stable URL: http://www.jstor.org/stable/2489103).*

Schmidt, Glen M., and Cheryl T. Druehl. "Changes in Product Attributes and Costs as Drivers of New Product Diffusion and Substitution." Production & Operations Management 14, No. 3 (Fall2005 2005): 272-285. Business Source Complete, EBSCOhost (accessed Sep. 23, 2010).*

Garling et al., "Marketing of Electric Vehicles," Business Strategy and the Environment, vol. 10, No. 1, pp. 53-65, Jan./Feb. 2001.

Cumbo et al., "Characterizing adopters of automated lumber grading systems," Forest Products Journal, vol. 51, No. 7/8, pp. 37-43, Jul./Aug. 2001.

Martinez et al., "The acceptance and diffusion of new consumer durables: differences between first and last adopters," Journal of Consumer Marketing, vol. 15, No. 4, pp. 323-342, 1998.

Selected pages regarding the Kirton Adaption-Innovation Inventory (KAI), obtained from http://www.kaicentre.com/; 23 pages, Last visited Sep. 4, 2007.

Gates et al., *Modeling Consumer Health Plan Choice Behavior to Improve Customer Value and Health Plan Market Share*, Journal of Business Research 48 (3), pp. 247-157, Jun. 2000.

Dandurand, *Market Niche Analysis in the Casino Gaming Industry*, Journal of Gambling Studies, vol. 6(1); 13 pages, Spring 1990.

Peltier and Schribrowsky, *The Use of Need-Based Segmentation for Developing Segment-Specific Direct Marketing Strategies*, Journal of Direct Marketing, vol. 11(4); 10 pages, Fall 1997.

Wind and Mahajan, *Marketing Hype: A New Perspective for New Product Research and Introduction*, J. Prod. Innov. Manag., vol. 4, No. 1; pp. 43-49, Mar. 1987.

Day, *The Product Life Cycle: Analysis and Applications Issues*, J. Marketing, vol. 45, pp. 60-67, Fall 1981.

Peter F. Drucker, "*The Executive in Action*", Managing for Results; pp. 64-77, 1986.

* cited by examiner

| NUMBER | CATEGORY | SUB-CATEGORY | QUESTION |
|---|---|---|---|
| 1 | ENVIRONMENT | CHANGE | HOW MUCH WILL THE IMPLEMENTATION OF THIS OFFERING IMPACT THE CLIENT'S CURRENT PROCESSES? |
| 1 | ENVIRONMENT | CHANGE | HOW MUCH WILL THE IMPLEMENTATION OF THIS OFFERING IMPACT THE CLIENT'S CURRENT PROCESSES? |
| 1 | ENVIRONMENT | CHANGE | HOW MUCH WILL THE IMPLEMENTATION OF THIS OFFERING IMPACT THE CLIENT'S CURRENT PROCESSES? |
| 2 | ENVIRONMENT | CHANGE | HOW MUCH WILL THE IMPLEMENTATION OF THIS OFFERING IMPACT THE CLIENT'S CURRENT TECHNOLOGY AND INFRAST |
| 2 | ENVIRONMENT | CHANGE | HOW MUCH WILL THE IMPLEMENTATION OF THIS OFFERING IMPACT THE CLIENT'S CURRENT TECHNOLOGY AND INFRAST |
| 2 | ENVIRONMENT | CHANGE | HOW MUCH WILL THE IMPLEMENTATION OF THIS OFFERING IMPACT THE CLIENT'S CURRENT TECHNOLOGY AND INFRAST |
| 3 | ENVIRONMENT | COMPETITION | ARE THERE COMPETING OFFERINGS THAT LEAD TO THE SAME OUTCOME? |
| 3 | ENVIRONMENT | COMPETITION | ARE THERE COMPETING OFFERINGS THAT LEAD TO THE SAME OUTCOME? |
| 3 | ENVIRONMENT | COMPETITION | ARE THERE COMPETING OFFERINGS THAT LEAD TO THE SAME OUTCOME? |
| 4 | ENVIRONMENT | INDUSTRY NOVELTY RE | WHAT IS THE RECEPTIVENESS OF THE APPLICABLE INDUSTRY TO NEW AND DISRUPTIVE CHANGES? |
| 4 | ENVIRONMENT | INDUSTRY NOVELTY RE | WHAT IS THE RECEPTIVENESS OF THE APPLICABLE INDUSTRY TO NEW AND DISRUPTIVE CHANGES? |
| 4 | ENVIRONMENT | INDUSTRY NOVELTY RE | WHAT IS THE RECEPTIVENESS OF THE APPLICABLE INDUSTRY TO NEW AND DISRUPTIVE CHANGES? |
| 4 | ENVIRONMENT | INDUSTRY NOVELTY RE | WHAT IS THE RECEPTIVENESS OF THE APPLICABLE INDUSTRY TO NEW AND DISRUPTIVE CHANGES? |
| 5 | ENVIRONMENT | RISK | WHAT LEVEL OF RISK DOES THE CLIENT ACCEPT BY USING THIS OFFERING? |
| 5 | ENVIRONMENT | RISK | WHAT LEVEL OF RISK DOES THE CLIENT ACCEPT BY USING THIS OFFERING? |
| 5 | ENVIRONMENT | RISK | WHAT LEVEL OF RISK DOES THE CLIENT ACCEPT BY USING THIS OFFERING? |
| 6 | NOVELTY | AMBIGUITY | DO THE APPLICATIONS OF THIS OFFERING REQUIRE EXPERIMENTATION OR RESOLUTION OF AMBIGUITIES? |
| 6 | NOVELTY | AMBIGUITY | DO THE APPLICATIONS OF THIS OFFERING REQUIRE EXPERIMENTATION OR RESOLUTION OF AMBIGUITIES? |
| 7 | NOVELTY | INGENUITY | DOES THE CORE IDEA OF THE OFFERING INVOLVE DELIVERING ANY R&D? |
| 7 | NOVELTY | INGENUITY | DOES THE CORE IDEA OF THE OFFERING INVOLVE DELIVERING ANY R&D? |
| 8 | NOVELTY | INGENUITY | DOES THE OFFERING INVOLVE THE INTRODUCTION OF A BRAND NEW TECHNOLOGY OR PROCESS? |

| ANSWER | WEIGHT | ADJ WEIGHT | OPTIMIZING | TRANSFORMATIVE | NEG | POS |
|---|---|---|---|---|---|---|
| LOW | -1 | -1.06 | -1 | 3 | -1.06383 | 0 |
| MODERATE | 1 | 0.89 | 0 | 0 | 0 | 0 |
| HIGH | 3 | 2.68 | 0 | 0 | 0 | 2.678571 |
| LOW | -2 | -2.13 | -2 | 5 | -2.12766 | 0 |
| MODERATE | 2 | 1.79 | 0 | 0 | 0 | 0 |
| HIGH | 5 | 4.46 | 0 | 0 | 0 | 4.4640286 |
| MANY | -5 | -5.32 | -5 | 4 | -5.31915 | 0 |
| FEW | -2 | -2.13 | 0 | 0 | 0 | 0 |
| NONE | 4 | 3.57 | 0 | 0 | 0 | 3.571429 |
| VERY LOW | -3 | -3.19 | -3 | 2 | -3.19149 | 0 |
| LOW | -2 | -2.13 | 0 | 0 | 0 | 0 |
| MODERATE | 1 | 0.89 | 0 | 0 | 0 | 0 |
| HIGH | 2 | 1.79 | 0 | 2 | 0 | 1.785714 |
| LOW | -1 | -1.06 | -1 | 0 | -1.06383 | 0 |
| MODERATE | 1 | 0.89 | 0 | 0 | 0 | 0 |
| HIGH | 2 | 1.79 | 0 | 2 | 0 | 1.785714 |
| NO | -1 | -1.06 | -1 | 4 | -1.06383 | 0 |
| YES | 4 | 3.57 | 0 | 0 | 0 | 3.571429 |
| NO | -1 | -1.06 | -1 | 0 | -1.06383 | 0 |
| YES | 3 | 2.68 | 0 | 3 | 0 | 2.678571 |
| NO | -2 | -2.13 | -2 | 2 | -2.12766 | 0 |

308 / 310 / 312 / 314 / 316 / 318 / 320

300

FROM FIG. 3A — TO FIG. 3D

| | | | |
|---|---|---|---|
| 8 | NOVELTY | INGENUITY | DOES THE OFFERING INVOLVE THE INTRODUCTION OF A BRAND NEW TECHNOLOGY OR PROCESS? |
| 9 | NOVELTY | INGENUITY | HAS R&E TAX CREDIT BEEN CLAIMED FOR ANY ASPECT OF DEVELOPING THIS OFFERING? |
| 9 | NOVELTY | INGENUITY | HAS R&E TAX CREDIT BEEN CLAIMED FOR ANY ASPECT OF DEVELOPING THIS OFFERING? |
| 9 | NOVELTY | INGENUITY | HAS R&E TAX CREDIT BEEN CLAIMED FOR ANY ASPECT OF DEVELOPING THIS OFFERING? |
| 10 | NOVELTY | INGENUITY | IS THE CORE IDEA OF THE OFFERING UNKNOWN TO THE MARKET? |
| 10 | NOVELTY | INGENUITY | IS THE CORE IDEA OF THE OFFERING UNKNOWN TO THE MARKET? |
| 11 | NOVELTY | PUBLICATION | WOULD THE CORE IDEA OF THE OFFERING BE SUITABLE FOR PUBLICATION OR CONFERENCE PRESENTATION (NOT INCLU |
| 11 | NOVELTY | PUBLICATION | WOULD THE CORE IDEA OF THE OFFERING BE SUITABLE FOR PUBLICATION OR CONFERENCE PRESENTATION (NOT INCLU |
| 12 | NOVELTY | TECHNOLOGY | DOES THE OFFERING INVOLVE THE USE OF A HIGH-TECH SOLUTION, AS DEFINED BY THE CLIENT? |
| 12 | NOVELTY | TECHNOLOGY | DOES THE OFFERING INVOLVE THE USE OF A HIGH-TECH SOLUTION, AS DEFINED BY THE CLIENT? |
| 13 | OBVIOUSNESS | COMBINATION | IS THE CORE IDEA OF THE OFFERING THE RESULT OF COMBINING TWO OR MORE PRE-EXISTING SOLUTIONS? |
| 13 | OBVIOUSNESS | COMBINATION | IS THE CORE IDEA OF THE OFFERING THE RESULT OF COMBINING TWO OR MORE PRE-EXISTING SOLUTIONS? |
| 14 | OBVIOUSNESS | EFFICIENCY | DOES THE OFFERING ENHANCE THE EFFICIENCY OF A PRE-EXISTING EXISTING SOLUTION? |
| 14 | OBVIOUSNESS | EFFICIENCY | DOES THE OFFERING ENHANCE THE EFFICIENCY OF A PRE-EXISTING EXISTING SOLUTION? |
| 15 | OBVIOUSNESS | PRIOR PUBLICATIONS | IS THERE A HISTORY OF PRIOR PUBLICATIONS OF THE CORE IDEA OF THE OFFERING? |
| 15 | OBVIOUSNESS | PRIOR PUBLICATIONS | IS THERE A HISTORY OF PRIOR PUBLICATIONS OF THE CORE IDEA OF THE OFFERING? |
| 16 | UTILITY | BETTER OUTCOME | DOES THE USE OF THE OFFERING LEAD TO A PRE-EXISTING OUTCOME, BUT WITH HIGHER EFFICIENCY, HIGHER PRODUCT |
| 16 | UTILITY | BETTER OUTCOME | DOES THE USE OF THE OFFERING LEAD TO A PRE-EXISTING OUTCOME, BUT WITH HIGHER EFFICIENCY, HIGHER PRODUCT |
| 17 | UTILITY | PRIMARY EFFECT OF O | WHAT IS THE PRIMARY EFFECT OF THE OFFERING? |
| 17 | UTILITY | PRIMARY EFFECT OF O | WHAT IS THE PRIMARY EFFECT OF THE OFFERING? |
| 18 | UTILITY | VALUE TIMELINE | WHEN WILL THE OFFERING LEAD TO ROI? |
| 18 | UTILITY | VALUE TIMELINE | WHEN WILL THE OFFERING LEAD TO ROI? |

*FIG. 3D*

| 308 | 310 | 312 | 314 | 316 | 318 | 320 |
|---|---|---|---|---|---|---|
| YES | 2 | 1.79 | 0 | 0 | 0 | 1.785714 |
| NO | -1 | -1.06 | -1 | 1 | -1.06383 | 0 |
| UNKNOWN | -0.1 | -0.11 | 0 | 0 | 0 | 0 |
| YES | 1 | 0.89 | 0 | 0 | 0 | 0.892857 |
| NO | -2 | -2.13 | -2 | 5 | -2.12766 | 0 |
| YES | 5 | 4.46 | 0 | 0 | 0 | 4.464286 |
| NO | -5 | -5.32 | -5 | 5 | -5.31915 | 0 |
| YES | 5 | 4.46 | 0 | 0 | 0 | 4.464286 |
| NO | -1 | -1.06 | -1 | 1 | -1.06383 | 0 |
| YES | 1 | 0.89 | 0 | 0 | 0 | 0.892857 |
| NO | -3 | -3.19 | -3 | 2 | -3.19149 | 0 |
| YES | 2 | 1.79 | 0 | 0 | 0 | 1.785714 |
| NO | -4 | -4.26 | -4 | 2 | -4.25532 | 0 |
| YES | 2 | 1.79 | 0 | 0 | 0 | 1.785714 |
| NO | -2 | -2.13 | -2 | 2 | -2.12766 | 0 |
| YES | 2 | 1.79 | 0 | 0 | 0 | 1.785714 |
| NO | -5 | -5.32 | -5 | 5 | -5.31915 | 0 |
| YES | 5 | 4.46 | 0 | 0 | 0 | 4.464286 |
| NO | -5 | -5.32 | -5 | 5 | -5.31915 | 0 |
| COST REDUCTION | 5 | 4.46 | 0 | 0 | 0 | 4.464286 |
| REVENUE GENERATION | -3 | -3.19 | -3 | 3 | -3.19149 | 0 |
| SOON AFTER IMPLEMENTATION | 3 | 2.68 | 0 | 0 | 0 | 2.678571 |
| SOME TIME AFTER IMPLEMENTATION | | | 47 | 56 | -50 | 50 |

FIG. 6

REPORT

602 — OFFERING NOVELTY RANGE: VERY LOW

THE OFFERING SERVES A MATURE MARKET AND ADDRESSES WELL-ESTABLISHED, ROUTINE BUSINESS FUNCTIONS ESSENTIAL TO THE OPERATION OF MOST LARGE BUSINESSES. THE PRIMARY BUSINESS DRIVER FOR THE CLIENT IS OPTIMIZING EXISTING SYSTEMS TO DELIVER MAXIMUM EFFICIENCY AT THE LOWEST POSSIBLE COST. VALUE IS CREATED BY LEVERAGING SMALL OR INCREMENTAL IMPROVEMENTS ACROSS LARGE ECONOMIES OF SCALE. DELIVERY MAY INVOLVE A HIGH DEGREE OF AUTOMATION, STANDARD PROCESSES ACROSS INDUSTRIES, AND VERY MATURE TECHNOLOGIES, INCLUDING MANY THAT COULD BE CONSIDERED ROUTINE OR LOW-TECH BY THE DAY'S STANDARDS. CLIENTS GENERALLY ACCEPT THAT THEY NEED THESE SERVICES AND SOMEONE TO PROVIDE THEM, BUT RARELY SEE THEM AS A SOURCE OF COMPETITIVE ADVANTAGE.

604 — GOOD PROSPECTS FOR THIS TYPE OF OFFERING.

GOOD PROSPECTS FOR THIS TYPE OF OFFERING. CONSERVATIVE, HIGHLY RISK-AVERSE INDIVIDUALS WHO MAY BE UNCOMFORTABLE WITH CHANGE. IDEAL CANDIDATES FEEL VALUE IS BEST CREATED BY TIGHT CONTROL OF COSTS AND CONTINUOUS, QUANTIFIABLE IMPROVEMENTS. THEY WANT GRADUAL, PROVEN ADJUSTMENTS TO THEIR TRUSTED WAYS OF DOING THINGS. THEY ARE OFTEN "GOOD CORPORATE CITIZENS" WHO STAUNCHLY DEFEND THE STATUS QUO AND ONLY TENTATIVELY ACKNOWLEDGE OBVIOUS PROBLEMS. THEY ARE PROUD THAT THEIR CURRENT SOLUTION IS VERY GOOD BUT ARE OPEN TO IMPROVEMENTS, BECAUSE EVEN THE BEST CAN BE MADE A LITTLE BETTER. THE IDEAL PROSPECT FOR THIS TYPE OF OFFERING HAS A KAI IN THE RANGE 32-64.

608 — WHAT TO DO IF A PROSPECT'S KAI IS A GOOD MATCH FOR THIS OFFERING.

WHAT TO DO IF A PROSPECT'S KAI IS A GOOD MATCH FOR THIS OFFERING. THE OFFERING IS GENERALLY WELL APPRECIATED BY THE PROSPECT, AND WILL ONLY NEED TO BE DESCRIBED IN DETAIL. THE SALES CHALLENGE IS MORE LIKELY FOUND IN OTHER AREAS SUCH AS PRICING OR DELIVERY HISTORY. STRESS THAT THIS OFFERING IS A BETTER SOLUTION BECAUSE IT SOLVES PROBLEMS THAT HAVE FRUSTRATED THEM PREVIOUSLY. HELP THEM FEEL CONFIDENT THAT THIS OFFERING BRINGS THEM A FEW STEPS CLOSER TO PERFECTION IN THIS AREA OF THEIR BUSINESS.

610 — WHAT TO DO IF THE PROSPECT'S KAI IS TOO LOW FOR THIS OFFERING.

WHAT TO DO IF THE PROSPECT'S KAI IS TOO LOW FOR THIS OFFERING.
1. THE PROSPECT MAY VIEW THIS OFFERING AS UNREALISTIC, RISKY, OR FUTURISTIC. THEY MAY CONSIDER THIS OFFERING ONLY AFTER OTHERS HAVE SUCCESSFULLY IMPLEMENTED IT. TO MITIGATE THIS SITUATION,
2. IF POSSIBLE, SEEK THE PARTICIPATION OF A CLIENT MEMBER WITH A BETTER-ALIGNED (HIGHER) KAI WHO CAN INFLUENCE THE DECISION.
3. PRESENT THE OFFERING IN A DIFFERENT LIGHT. THOROUGHLY EMPHASIZE LOW COST, LOW RISK, AND QUANTIFIABLE VALUE.
4. USE DETAILED, STEP-BY-STEP ANALYSIS; AND MAKE SURE EACH KEY ELEMENT (AND ITS VALUE) IS AGREED UPON BEFORE MOVING TO THE NEXT.
5. LEVERAGE ANY SUCCESS STORIES, CUSTOMER REFERENCES, OR IMPLEMENTATION HISTORY.
6. CONVINCE THE PROSPECT THAT THERE IS MINIMAL RISK IN IMPLEMENTING THE OFFERING, SO IT'S CLEAR THEY HAVE SOMETHING TO GAIN WITH NOTHING TO LOSE. PEOPLE/INSTITUTIONS WITH A KAI THIS LOW CAN GO OUT OF THEIR WAY TO FIND REASONS NOT TO DO SOMETHING. HANDLE ALL OF THEIR OBJECTS CAREFULLY, AND MAKE THEM FEEL COMFORTABLE THAT THEY ARE NOT TAKING A RISK WITH OUR OFFERING AND THAT THEY ARE BENEFITING THEIR COMPANY.
7. CONSIDER AUGMENTING OR REPLACING THE OFFERING WITH ONE THAT BETTER MATCHES THE PROSPECT'S KAI.

612 — WHAT TO DO IF THE PROSPECT'S KAI IS TOO HIGH FOR THIS OFFERING.

WHAT TO DO IF THE PROSPECT'S KAI IS TOO HIGH FOR THIS OFFERING.
1. THE PROSPECT WILL LIKELY VIEW THIS OFFERING AS LACKING INNOVATION, AND WILL NOT HELP THEM COMPETE IN THE MARKET. TO MITIGATE THIS SITUATION,
2. IF POSSIBLE, SEEK THE PARTICIPATION OF A CLIENT MEMBER WITH A BETTER-ALIGNED (LOWER) KAI WHO CAN INFLUENCE THE DECISION.
3. PRESENT THE OFFERING IN A DIFFERENT LIGHT. EMPHASIZE THE INNOVATIVE, NOVEL, AND MARKET-LEADING ASPECTS OF THE OFFERING TO A DEGREE APPROPRIATE FOR THE PROSPECT'S HIGHER KAI.
4. CREATE AND COMMUNICATE A VISION OF WHERE THIS OFFERING WILL TAKE THE PROSPECT IN THE FUTURE.
5. CONSIDER AUGMENTING OR REPLACING THE OFFERING WITH ONE THAT BETTER MATCHES THE PROSPECT'S KAI.

FIG. 8A

| KAI RANGE | ADVANTAGES | DISADVANTAGES |
|---|---|---|
| 32-58 | • CAN HANDLE EMERGENCIES<br>• CAN ADAPT AUTOMATED SYSTEMS AS TOOLS<br>• LIKES STRESS TO CREATE TIME FRAME<br>• ANALYTICAL<br>• TRIES TO FIT THINGS INTO CURRENT SITUATION | • HIGHLY FOCUSED<br>• NARROW MINDED<br>• NOT A GAMBLER<br>• APPEARS UNAPPROACHABLE...SEEN AS INTENSE<br>• SEEN AS TOO APPLIED...NOT THEORETICAL |
| 59-67 | • MAINTAINS SENSE OF ORDER AND CALM<br>• PERFECTIONIST<br>• TEAM WORKER, SEEN AS "COMPANY PERSON"<br>• PEACEMAKER, ADDS STABILITY<br>• PRACTICAL<br>• SUPPORTIVE AND SENSITIVE TO SUBORDINATES | • ACCEPTS RATHER THAN CHALLENGES<br>• FEAR OF VOICING NEW IDEAS<br>• NEEDS ALL THE FACTS FIRST<br>• ANALYSES PROBLEM TOO MUCH<br>• WASTES TIME ORGANIZING<br>• DOESN'T SEE THE "BIG PICTURE" EASILY |
| 68-75 | • STRUCTURED<br>• TASK-ORIENTED<br>• TARGETED<br>• CONSCIENTIOUS<br>• LIKES TO GATHER ALL THE FACTS | • MAY BE CLOSE-MINDED<br>• WANTS IT DONE OWN WAY<br>• IDEAS NOT TOO ORIGINAL |
| 76-85 | • MORE EFFICIENT<br>• SERIOUS-MINDED<br>• MAXIMIZES AVAILABLE RESOURCES<br>• FREE FROM URGE TO BLOW OWN HORN<br>• LOOKS FOR WAYS TO IMPROVE THINGS | • LOW PROFILE<br>• MAY SLOW THE CHANGE PROCESS |
| 86-93 | • RELIABLE, STABLE<br>• FINDS SOLUTION QUICKLY<br>• MORE CONSISTENT<br>• SENSITIVE TO WHAT IS GOING ON | • TENDS TO EMPHASIZE UTILITY OVER NOVELTY<br>• DEPENDENT ON STRUCTURE<br>• TURNS OFF SUGGESTIONS<br>• SLOWS DOWN NEW APPROACHES |

FIG. 8B

| KAI RANGE | ADVANTAGES | DISADVANTAGES |
|---|---|---|
| 94-99 | • CAN SEE BOTH SIDES OF ARGUMENT<br>• FLEXIBILITY...ONCE A PROJECT IS FINISHED, CAN MOVE ON TO ANOTHER EASILY<br>• GOAL ORIENTED<br>• STRUCTURE...SECURITY<br>• CONTINUITY, DEPENDABILITY<br>• PROBABILITY OF SUCCESS<br>• TRUST | • SEEN AS INDECISIVE<br>• NOT ENOUGH RISK-TAKING<br>• LACK OF IMAGINATION...STAGNATION<br>• LESS LONG-TERM VIABILITY OF IDEAS<br>• BOTTLENECKS<br>• WEAK IN UNSTRUCTURED SITUATIONS |
| 100-105 | • TRANSLATORS<br>• HONEST BROKERS<br>• FACILITATORS<br>• SUMMARIZERS<br>• BALANCERS...SENSITIVE<br>• MENTORS<br>• INTEGRATED, VERSATILE, HIGHLY EMPLOYABLE | • TOO FLEXIBLE<br>• MOVE TOO EASILY FROM ONE PROJECT TO ANOTHER |
| 106-116 | • POSITIVE THINKERS<br>• SELF-SATISFIED<br>• CALCULATED RISK-TAKERS<br>• STRONG FACILITATORS<br>• GOOD POLITICAL POSITIONING<br>• TOLERANT OF EXTREMES<br>• GOOD TEAM PLAYERS<br>• FINGERS IN MANY PIES<br>• NETWORKING GADFLIES<br>• SYNTHESIS OF PARADOX<br>• SENSITIVE, EMPATHIC | • LOW TOLERANCE FOR BOREDOM<br>• LOW TOLERANCE FOR BORING PEOPLE<br>• CAN SEE AMBIGUITY OF IT ALL<br>• OWN NEEDS OFTEN LEFT OUT<br>• CAUGHT IN MIDDLE WHEN BALANCING<br>• INSIST ON CONSENSUS |

| KAI RANGE | ADVANTAGES | DISADVANTAGES |
|---|---|---|
| 117-125 | • MANIPULATE ADAPTIVE STRUCTURE<br>• PERCEIVED AS TEAM MEMBER AND SLIPS IN INNOVATIONS<br>• HIGH PROBABILITY OF INNOVATIVE IDEAS HAVING PRACTICAL APPLICATION<br>• VERY FLEXIBLE<br>• SCIENTIFIC FACILITATOR<br>• FUNCTIONAL CREATIVITY<br>• LIKES REAL-WORLD PROBLEMS | • DETERMINES OWN AGENDA WHICH MAY NOT BE RELEVANT TO THE ORGANIZATION'S AGENDA<br>• LIKES HIGH STATUS COMPETITION<br>• ONLY PERSON IN OFFICE WITH A MESSY DESK<br>• IMPATIENCE<br>• LOW TOLERANCE FOR ADAPTORS<br>• BUILT-IN LOGIC...INTUITION |
| 126-137 | • EASY TO GET NOTICED IN BIG ORGANIZATIONS<br>• CAN AMUSE SELF...FUN<br>• WILL WORK DAY AND NIGHT ON A PROBLEM<br>• NECESSARY FOR MAKING BIG CHANGES<br>• STARTS MANY PROJECTS<br>• OPTIMISTIC...NOT BORED<br>• REDEFINES LIMITS<br>• PRAGMATIC TRANSFORMER<br>• IMPATIENT<br>• FAST-TRACKER<br>• TAKES HIGHER LEVELS OF RISK<br>• OPPORTUNITY TO WORK ON THE CUTTING EDGE | • HARD TO GET POSITIVE RECOGNITION IN BIG ORGANIZATIONS<br>• GET STUFF STOLEN BY BOSSES<br>• WILL WORK DAY AND NIGHT TO DETRIMENT OF OTHER RELATIONSHIPS<br>• TOO MANY OF US GET NOTHING DONE<br>• FINISHES FEW PROJECTS<br>• STOPS ONCE THE END IS SEEN<br>• NOT INTERESTED IN SMALL PROJECTS<br>• MUST LEARN TO COMMUNICATE WITH OTHERS<br>• IMPATIENT, STUBBORN, FRUSTRATED<br>• HATES TO TRANSLATE THOUGHTS INTO WRITTEN WORD |
| 138-160 | • FUN AND ADVENTURE<br>• CHANGE<br>• OPENNESS<br>• SENSE OF HUMOR, SARCASM, PUNSTERS<br>• IMPROVISES READILY<br>• WRONGNESS IS OK<br>• HIGH ENERGY, EASY IDEA FLOW<br>• SEES, MAKES UNUSUAL CONNECTIONS<br>• PERSEVERANCE<br>• DRIVEN, SELF-STARTER<br>• INTUITIVE<br>• LIKES PEOPLE<br>• WELCOMES PROBLEMS, PUZZLES<br>• CREATES OWN ENVIRONMENT<br>• HAS LEARNED TO SURVIVE<br>• CREATIVE THINKING WORKS AT HIGH SPEED | • TOO FLEXIBLE<br>• TOO MUCH VARIETY<br>• BORED TOO EASILY<br>• TAKES ON TOO MUCH<br>• CONTEMPT FOR BUREAUCRACY<br>• VERY IMPATIENT<br>• OVERLY CRITICAL<br>• LOSES THINGS<br>• HATES STRUCTURE AND RED TAPE<br>• HATES TO BE TOLD "HOW TO"<br>• SOME PROCRASTINATION<br>• HATES DETAILS<br>• SOMETIMES FORCED TO ACT<br>• DISORDERLY, MESSY |

US 7,966,212 B2

QUANTITATIVE ALIGNMENT OF BUSINESS OFFERINGS WITH THE EXPECTATIONS OF A BUSINESS PROSPECT

TECHNICAL FIELD OF THE INVENTION

The present invention relates generally to business offerings and more particularly to quantitative alignment of business offerings with the expectations of a business prospect.

BACKGROUND

Business enterprises are increasingly subject to global competition. Typically, each enterprise attempts to present its offerings (e.g., products and/or services) to prospects (e.g., existing or potential customers) in the best possible light to increase the probability of winning sales pursuits. Innovation is a factor that is increasingly important in the sales process and is sometimes the key factor in winning or losing a deal. For example, if one or more prospects perceive an offering of an enterprise as lacking innovation, those prospects may pass on the offering of the enterprise, which may lead to lost revenues for the enterprise.

Selling with innovation is typically challenging. What constitutes innovation may be very different for different people, even for the same offering. An offering that is innovative from one prospect's perspective may be perceived as mundane to another prospect. For example, a first prospect may view the use of MICROSOFT POWERPOINT in "portrait mode" (rather than in the typical "landscape mode") as highly innovative. A second prospect may view a PhD dissertation in computational linguistics as innovative. The second prospect would likely reject the POWERPOINT-in-portrait-mode example as trivial, while the first prospect would likely view the PhD dissertation as risky, futuristic, and unready for implementation.

Moreover, different people within the same organization may perceive the innovation level of the same offering differently from one another. For example, a data-mining and text-mining offering for a warranty system may be difficult to understand and appreciate for a first director-level person; whereas, another director-level person in the same company may readily understand and appreciate such an offering.

SUMMARY OF THE INVENTION

According to the present invention, disadvantages and problems associated with previous techniques for aligning business offerings with the expectations of a business prospect may be reduced or eliminated.

In certain embodiments, a method for quantitative alignment of business offerings with the expectations of a business prospect includes accessing a novelty indicator for an offering, the novelty indicator being based on one or more characteristics of the offering and rating an innovation level of the offering. The method further includes accessing an innovation perception indicator for a prospect of the offering, the innovation perception indicator providing an indication of how the prospect views innovation. The method further includes comparing the novelty indicator for the offering with the innovation perception indicator for the prospect to determine if the offering is aligned with the expectations of the prospect.

Particular embodiments of the present invention may provide one or more technical advantages. Conventional techniques for aligning offerings with the expectations of a business prospect typically rely on guesswork and intuition. Previous and existing solutions typically require an individual person to manually align offerings with client expectations, are highly subjective, and are non-repeatable—sometimes being nothing more than a wild guess.

Certain embodiments of the present invention increase the probability of winning sales pursuits by quantitatively aligning offerings with the expectations of business prospects. For example, certain embodiments use a personality psychometric (e.g., to determine an innovation perception indicator) to assess a prospect's view of innovation and expectations from an offering, and also quantitatively assess the novelty of an offering. Sales win rates may be increased by aligning the appropriate offering with the appropriate prospect. Although enhancement of the sales process is primarily described, certain embodiments of the present invention may facilitate intelligent product configuration and custom service offerings. In certain embodiments, the present invention is delivered as an online tool, helping a sales professional to rapidly assess the novelty of an offering and determine a sales strategy that would maximize the win rate.

According to certain embodiments of the present invention, a scientific analysis of personality types and preferences is used to determine an innovation perception indicator (e.g., a numeric innovation perception index) for a prospect. In certain embodiments, the process for calculating a novelty indicator (e.g., a numeric novelty index) may be checked and validated against empirical data. In certain embodiments, the present invention includes assessing an offering, generating a quantitative representation of the novelty of the offering (e.g., a novelty index for the offering), and facilitating alignment of the novelty of the offering with the expectations of a prospect. When such alignment does not exist, the present invention may provide suggestions regarding how to present the offering in the best light. The recommendations may help deliver the right message to the right prospect by better aligning offerings with prospects, so that the prospects' expectation of innovation (or lack thereof) are properly met, which may lead to winning more sales pursuits.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 3A-3D illustrate an example questionnaire that may be used to determine the one or more characteristics of the offering for determining the novelty indicator for the offering, according to certain embodiments of the present invention;

FIG. 6 illustrates an example report novelty category report, according to certain embodiments of the present invention;

FIGS. 8A-8C illustrate an example KAI estimation table that may be used to estimate the KAI score of a prospect, according to certain embodiments of the present invention.

DESCRIPTION OF EXAMPLE EMBODIMENTS

Figure 1:
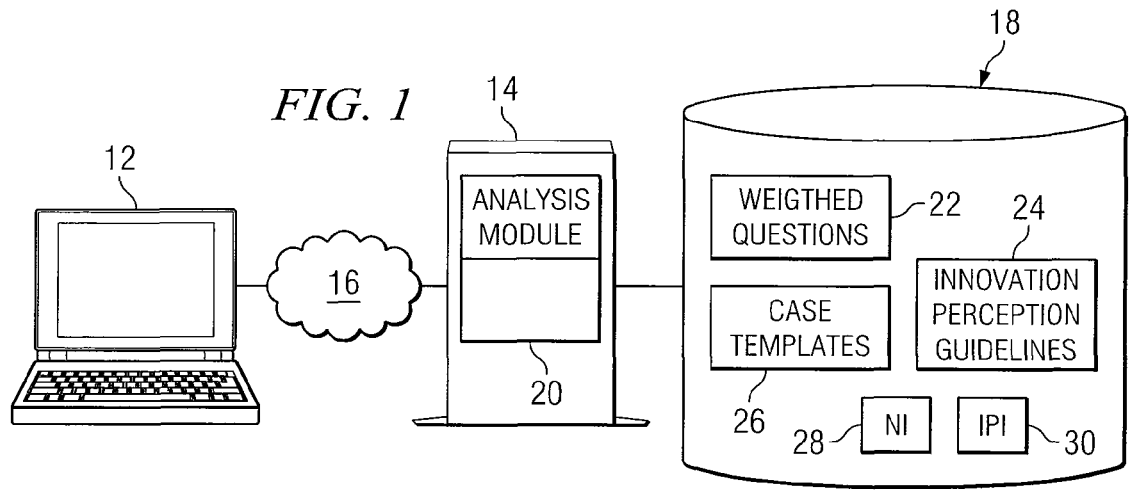
FIG. 1 illustrates an example system for aligning a business offering with the expectations of a business prospect, according to certain embodiments of the present invention.

FIG. 1 illustrates an example system 10 for aligning a business offering with the expectations of a business prospect, according to certain embodiments of the present invention. System 10 may include one or more user systems 12, a server system 14, and a network 16. Although this particular implementation of system 10 is illustrated and primarily described, the present invention contemplates any suitable implementation of system 10 according to particular needs.

In general, system 10 is operable to facilitate the alignment of the characteristics of a business offering with the expectations of a business prospect based on a comparison of a novelty indicator determined for the offering and an innovation perception indicator determined for the prospect. A business offering may include a service, product, or combination thereof that an entity such as a business enterprise may wish to sell or otherwise offer to a prospect. A prospect may include an individual or organization to whom an entity may wish to sell or otherwise offer a business offering. For example, a prospect may include an existing customer of an enterprise, a potential customer of an enterprise, a division within an enterprise, or any other suitable target of an offering. It should be noted that typically the prospect will be a an individual, such as an employee of the company that is the target of the sale or another suitable person. However, the present invention contemplates the prospect being the target entity as a whole (or any subgroup thereof, such as a division). Certain embodiments of the present invention may help increase sales "win rates" by assisting an enterprise in offering the appropriate business offering to the appropriate prospect. This may be accomplished by attempting to match the offering to the expectations of a business prospect.

System 10 may include one or more user systems 12. User systems 12 may be associated with an enterprise. As an example, a user of user system 12 may include various employees of the enterprise, such as may be sales people or other employees/analysts. Moreover, "user system 12" and "user of user system 12" may be used interchangeably. A user of user system 12 may include, for example, a human user or a computer program or other suitable software module for automatically interacting with user system 12.

User system 12 may include any appropriate input devices, output devices, mass storage media, processors, memory, or other suitable components for receiving, processing, storing, and communicating data. For example, user system 12 may include a personal computer, workstation, network computer, kiosk, wireless data port, personal data assistant (PDA), one or more Internet Protocol (IP) telephones, one or more processors within these or other devices, or any other suitable processing device. As a particular example, user system 12 may include a computer that includes an input device, such as a keypad, touch screen, mouse, or other device that can accept information, and an output device that conveys information associated with the operation of user system 12 or server system 14, including digital data, visual information, or any other suitable information. Both the input device and output device may include fixed or removable storage media such as a magnetic computer disk, CD-ROM, or other suitable media to both receive input from and provide output to a user of user system 12.

User system 12 may be local to or remote from server system 14. Although a particular number of user systems 12 is illustrated and primarily described, the present invention contemplates system 10 including any suitable number of user systems 12. For example, in certain embodiments, server system 14 is coupled to multiple distributed user systems 12. User systems 12 may be physically distributed, being in different locations geographically remote from each other and from server system 14, or logically distributed, being at approximately the same location as other user systems 12 and server system 14. For simplicity, the one or more user systems 12 of system 10 will be referred to in the singular throughout the remainder of this description.

User system 12 may be coupled to server system 14 via network 16. Network 16 facilitates wireless or wireline communication. Network 16 may communicate, for example, IP packets, Frame Relay frames, Asynchronous Transfer Mode (ATM) cells, voice, video, data, and other suitable information between network addresses. Network 16 may include one or more local area networks (LANs), radio access networks (RANs), metropolitan area networks (MANs), wide area networks (WANs), all or a portion of the global computer network known as the Internet, and/or any other communication system or systems at one or more locations.

Server system 14 may include one or more electronic computing devices operable to receive, transmit, process, and store data associated with system 10. For example, server system 14 may include one or more general-purpose personal computers (PCs), Macintoshes, workstations, Unix-based computers, server computers, or any other suitable devices. In short, server system 14 may include any suitable combination of software, firmware, hardware, and any other suitable components. Server system 14 may include a single server or any suitable number of servers. For example, server system may include a number of servers arranged in a server pool.

FIG. 1 merely provides one example of computers that may be used with the invention. For example, although FIG. 1 provides one example of server system 14 that may be used with the present invention, system 10 may be implemented using computers other than servers. The present invention contemplates computers other than general purpose computers as well as computers without conventional operating systems. As used in this document, the term "computer" is intended to encompass a personal computer, workstation, network computer, a portable computing device, or any other suitable processing device.

Each computer system of system 10 may include one or more processing modules and one or more memory modules. A processing module may include one or more microprocessors, controllers, or any other suitable computing devices or resources. Processing modules may work, either alone or with other components of system 10, to provide the functionality of system 10 described herein. Each memory module may take the form of volatile or non-volatile memory including, without limitation, magnetic media, optical media, random access memory (RAM), read-only memory (ROM), removable media, or any other suitable memory component.

Server system 14 may be coupled to one or more databases 18, referred to hereinafter for simplicity in the singular. Database 18 may include any memory or database module and may take the form of volatile or non-volatile memory, including, without limitation, magnetic media, optical media, RAM, ROM, removable media, or any other suitable local or remote memory component. In certain embodiments, database 18 includes one or more SQL servers. Database 18 may be local to or remote from other components of system 10. User system 12, server system 14, and database 18 may each include any suitable combination of software, firmware, and hardware associated with one or more computer systems at one or more locations.

Server system 14 includes an analysis module 20, which may facilitate alignment of an offering with the expectations of a prospect. Analysis module 20 may include any suitable combination of software, firmware, and hardware. In certain embodiments, analysis module 20 is a web-enabled software application, although the present invention contemplates analysis module 20 being implemented in any suitable manner. User system 12 may interact with analysis module using a graphical user interface (GUI) such as may be associated with a web browser. For example, the GUI may be delivered using an online portal or hypertext mark-up language (HTML) pages for display and data capture.

Analysis module 20 is operable to access a novelty indicator for an offering, access an innovation perception indicator for the prospect, and compare the novelty indicator of the offering with the innovation perception indicator for the prospect to determine if the offering is aligned with the expectations of the prospect. Each of these concepts is described in more detail below.

Analysis module 20 may access a novelty indicator for the offering. The novelty indicator for an offering may quantify the level of innovation of the offering. Although particular techniques for determining the novelty indicator for an offering are described, the present invention contemplates any suitable technique for determining the novelty indicator for an offering.

Innovation may include elements of both creativity and implementation. The level of innovation of an offering may be rated on a continuum of novelty ratings. One end of the continuum may be associated with "optimizing innovation," and the other end of the continuum may be associated with "transformative innovation." An offering may have both optimizing and transformative elements, which may explain why it is appropriate to consider the novelty of offerings on a continuum.

An optimizing innovation may include an incremental innovation that leads to cost reduction and/or quality improvement. For example, characteristics of a more optimizing offering may include an incremental improvement, lower risk, better standard solution, and a clearer return-on-investment. A transformative innovation may include a game-changing innovation that leads to new revenue sources. For example, characteristics of a more transformative offering may include a disruptive change, a new and different solution, higher risk, and ambiguous return-on-investment.

TABLE 1, below, provides some example characteristics that tend to shift an offering to characterization as either a transformative or an optimizing offering. The characteristics provided in TABLE 1 are for example purposes only. Additionally, in certain embodiments, the characteristics listed in TABLE 1 (or other appropriate characteristics) are general characteristics that are considered as a whole rather than as a checklist when evaluating an offering.

TABLE 1

| Transforming Offerings | Optimizing Offerings |
| --- | --- |
| Highly inventive | Improvements to an existing idea |
| Disruptive change | Incremental change |
| New revenue opportunity | Cost reduction |
| Long-term return on investment | Short-term return on investment |
| Needs incubation | Ready to implement |
| Out-of-the-box solution | In-the-box solution |
| Potential for high return on investment | Certain but limited return on investment |

An example of a transformative offering may include an offering related to nano-biometrics. An example of an optimizing offering may include providing cheaper phone service. An example of an offering that falls between a transformative offering and an optimizing offering may include integrated mobile/voice-over-Internet-Protocol (VoIP).

Another example optimizing offering according to certain embodiments may include a phone service offering that uses traditional phone lines and includes typical features such as voicemail, call-forwarding, and caller ID. The offering may include taking over existing hardware and maintenance contracts and centrally managing the service at the prospect's sites. This offering may save the client seven percent per year in phone charges. This offering may be given a novelty index of fifteen, for example.

Another example transformative offering according to certain embodiments may include the following scenario. An academic partner has a client that is seeking to put into production a research project that was completed by the university. The underlying technology of the project involves advanced visualization. This technology was proven by the research project, and the prospect is confident that the solution is practical. However, this solution has not been put into production before. The offering involves taking the outcome of the research project and developing the application as specified. The prospect expects to use the solution to better understand its customer's needs, avoid churn, and increase revenues. This offering may be given a novelty index of seventy-five, for example.

The novelty indicator for an offering may be based on one or more characteristics of the offering. In certain embodiments, a questionnaire may be used to identify various characteristics of an offering. For example, the questionnaire may include one or more questions designed to elicit responses that identify characteristics of the offering. As will be described in more detail below, at least a portion of the responses may be used to determine the novelty indicator for the offering.

The questionnaire may include one or more weighted questions. In certain embodiments, weighted questions 22 may be stored in database 18. A user of user system 12 may request the questionnaire from analysis module 20. In response to the request, analysis module 20 may access weighted questions 22 in database 18 and initiate display of the questions on user system 12. For example, analysis module 20 may communicate weighted questions 22 as a questionnaire to user system 12 for display on user system 12. A user of user system 12 may generate responses to weighted questions 22 of the questionnaire, the responses being communicated to analysis module 20. As will be described in more detail below, analysis module 20 may analyze the responses to weighed questions 22 to compute a numeric novelty index for the offering.

FIGS. 3A-3D, described below, provide an example questionnaire that may be used to determine one or more characteristics of an offering and for determining a novelty indicator for the offering.

Analysis module 20 may determine the novelty indicator for an offering by computing a numeric novelty index for the offering based on the one or more characteristics of the offering, the novelty index quantifying the innovation level of the offering. The one or more characteristics of the offering may be determined according to one or more weighted questions 22 of a questionnaire, the novelty index being determined according to responses to the one or more weighted questions 22. For example, analysis module 20 may initiate display of the one or more weighted questions 22 of the questionnaire, receive responses to the one or more weighted questions 22, and automatically determine the novelty index based on the responses to the one or more weighted questions 22 and the weights of the one or more weighted questions 22.

Analysis module 20 may determine a novelty group for the offering based on the determined novelty index, the novelty indicator comprising the novelty group. The novelty group may be one of a plurality of possible novelty groups, each novelty group associated with a corresponding range of novelty index values. For example, the novelty continuum may be associated with a range of numeric novelty index values, the range being divided into a number of sub-ranges each associated with a novelty group. Analysis module 20 may determine the novelty group for the offering by determining a particular range of novelty index values within which the computed novelty index falls and determining that the novelty group for the offering comprises the novelty group that corresponds to the particular range of novelty index values.

In certain embodiments, using novelty groups may assist with the interpretation of the novelty index. As an example, the novelty index continuum may be divided into multiple segments (e.g., five segments), each of which may be given a symbolic name (e.g., Purple, Teal, Orange, Navy, and Mauve). The symbolic names may help reduce or eliminate quantitative bias and simplify the use of the tool. The segments of the novelty continuum may be referred to as novelty groups or novelty categories, each novelty group being associated with a corresponding range of novelty index values.

In addition to accessing a novelty indicator for the offering, analysis module 20 may be operable to access an innovation perception indicator for the prospect of the offering. The innovation perception indicator may quantify how the prospect views innovation. For example, the innovation perception indicator may be a profile for the prospect that provides a scientific measure of a prospect's perception of innovation in offerings. In certain embodiments, the profile may be based on the prospect's personality, user profile, or other suitable information about the prospect. Individuals may perceive the innovation of an offering in different ways based on characteristics of the individuals. In certain embodiments, the innovation perception indicator is an index that provides a numeric representation of how a prospect views innovation.

As described above, typically the prospect will be a an individual, such as an employee of the company that is the target of the sale or another suitable person. However, the present invention contemplates the prospect being the target entity (or any subgroup thereof, such as a division), such that the innovation perception indicator is determined for the entity as a whole and measures how the entity as a whole views innovation.

In certain embodiments, the innovation perception indicator for a prospect may be determined using a personality psychometric, such as the KIRTON ADAPTATION-INNOVATION INVENTORY (KAI) tool, which may be used to quantify an individual's or group's perception of innovation. Although use of the KAI tool for determining the innovation perception indicator is primarily described, the present invention contemplates using any suitable tool for quantifying a prospect's perception of innovation. For example, another suitable technique for quantifying a prospect's perception of innovation is described in U.S. Patent Publication No. 2004/0064358 A1.

Figure 7:
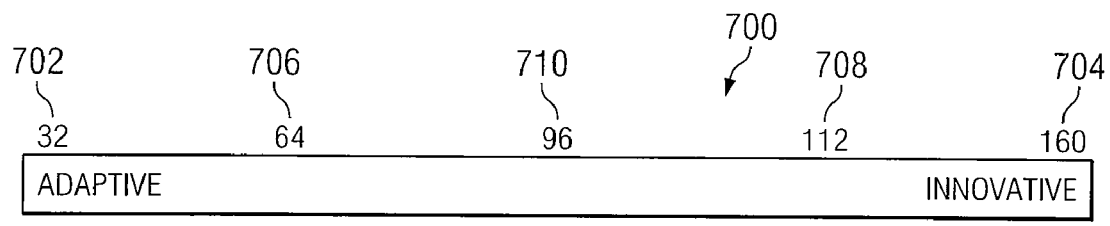
FIG. 7 illustrates an example KAI scale, which may be used to determine the innovation perception indicator for a prospect according to certain embodiments of the present invention.

The output of using the KAI tool may be a KAI score for the prospect being evaluated. The KAI score may indicate how the prospect goes about being creative, the preferred style of problem solving, or any other suitable information for quantifying the prospect's perception of innovation. FIG. 7, described below, provides an example KAI scale that may be used according to certain embodiments of the present invention.

The KAI score of a prospect may be determined using a KAI test administrated by a KAI-certified individual to evaluate the prospect. However, it may be difficult, impossible, or undesirable to administer such a test to a prospect (although the present invention contemplates performing such a test). For example, it may be undesirable to bother a prospect with such a test, or the enterprise evaluating the alignment of the offering with the expectations of the prospect may not want to involve the prospect in such a test. As described below with respect to FIGS. 8A-8C, the KAI score of a prospect may be estimated according to perceived behavioral patterns of the prospect, using a KAI estimation table for example. Database 18 may store various innovation perception guidelines 24, which may guide a user of system 12 in determining an appropriate innovation perception indicator for a prospect. For example, innovation perception guidelines 24 may include one or more KAI estimation tables for use in evaluating a prospect and determining an appropriate KAI score for the prospect.

In certain embodiments, the determined KAI score, which may be a number in the range of 32 to 160, may be converted to a range from 0 to 100 to determine the innovation perception indicator (IPI) for the prospect. This may allow the innovation perception indicator for the prospect to be more easily compared to the novelty indicator for the offering, as will be described in more detail below. The conversion may be calculated according to the following formula:

$$IPI=(KAI\ score-32)/128$$

If the KAI score is available in absolute form (e.g., 96), as may be the case when the KAI test is actually administered for a prospect, then that score may be used in the conversion formula. If the KAI score is determined to be a range, as may be the case when the KAI score for a prospect is estimated, then in certain embodiments the range may be converted using the conversion formula, and the midpoint of the resulting range may be used as the innovation perception indicator for the prospect. For example, a KAI range of 94-99 may be converted to an IPI range of 48-52 (e.g., using the above-described formula), and the midpoint of 50 may be used as the innovation perception indicator for that prospect. According to the example described above, a low IPI value indicates that the prospect has optimizing expectations of innovation, and a high IPI indicates that the prospect has transformative expectations of innovation.

Although particular techniques for determining a prospect's innovation perception indicator are described, the present invention contemplates any suitable technique for determining a prospect's innovation perception indicator according to particular needs.

Analysis module 20 may be operable to determine whether the offering is aligned with the expectations of the prospect by comparing the novelty indicator for the offering to the innovation perception indicator for the prospect. For example, analysis module 20 may compare the novelty index for the offering to the innovation perception indicator for the prospect to determine whether the novelty index and the innovation perception indicator match. It should be understood that a "match" may include both a match of exact equivalence (e.g., a novelty indicator of 40 and an innovation perception indicator of 40) or a match within a suitable range of values. If analysis module 20 determines that the novelty indicator for the offering matches the innovation perception indicator for the prospect, then analysis module 20 may determine that the offering is aligned with the expectations of the prospect.

As described above, the novelty indictor for an offering may be a novelty group determined based on a computed novelty index. To simplify the comparison process, database 18 may store associations of innovation perception indictors with particular novelty groups. Based on the determined innovation perception indicator for a particular prospect, analysis module 20 may determine whether the determined innovation perception indicator is one that is associated with the determined novelty group for the offering. Another way to view this comparison is that analysis module 20 may determine whether the novelty group of the offering is associated with the determined innovation perception indicator for the prospect. If the determined innovation perception indicator for the prospect is associated with the novelty group of the offering, then analysis module 20 may determine that the offering matches the prospect's expectations. On the other hand, if the determined innovation perception indicator for the prospect is not associated with the novelty group of the offering, then analysis module 20 may determine that the offering does not match the prospect's expectations.

The alignment of the offering with the expectations of the prospect may leverage the fact that people with different innovation perception indicators gravitate toward different solutions and may interpret or perceive the innovation level of an offering differently. Theoretically, the comparison performed by analysis module 20 aligns the adaptive end of the innovation perception indicator scale (e.g., the KAI scale) with the optimization end of the novelty indicator continuum and aligns the innovative end of the innovation perception indicator scale (e.g., the KAI scale) with the transformative end of the novelty indicator continuum. In an ideal situation, an offering is presented to a prospect when the offering is aligned with the expectations of a business prospect.

In certain embodiments, analysis module 20 may provide one or more recommendations to a user based on the comparison of the novelty indicator of the offering and the innovation perception indicator of the prospect. Analysis module 20 may communicate the one or more recommendations to user system 12 or another suitable device for display or other suitable playback. It is often the case that one or more persons associated with the enterprise providing the offering may use embodiments of the present invention in preparing for a presentation regarding the offering to one or more prospects. The recommendations provided by analysis module 20 may provide advice regarding such a presentation.

Recommendations may or may not be pre-generated and stored in database 18. In certain embodiments, a set of recommendations is pre-stored for each novelty group, including what to do if a prospect's innovation perception indicator is determined by analysis module 20 to be too low or too high for the novelty indicator (e.g., novelty group). The recommendations may include any suitable suggestions, including inviting one or more other prospect's to a meeting regarding the offering (e.g., another member of the prospect's team who has a closer innovation perception indicator), what aspect(s) of the offering to emphasis, and even what additional offerings should be used to augment or replace the initial offering.

For example, if analysis module 20 determines that the offering matches the expectations of the prospect, analysis module 20 may provide a first set of recommendations. Recommendations provided in the case of a match may include general recommendations as to features of the offering to emphasize, particular recommendations as to features of the offering to emphasize, the length of the presentation, advantages of the offering to emphasize, or any other suitable recommendations.

Recommendations may be generated based on various case templates 26, and the knowledge of the prospect or audience's innovation perception indicator. For example, case templates 26 may provide pre-scripted text for addressing certain novelty indicators, innovation perception indicators, and relationships between the novelty indicator and innovation perception indicator. Finally, the ideal prospect or audience may be identified along with specific recommendations for the sales strategy. The recommendation may include an indication of an ideal audience.

In certain embodiments, database 18 or another suitable component of system 10 may provide one or more of the following to a user of user system 12: an overview of perceptions of innovation; instructions on how to assess a prospect's innovation perception indicator; instructions on how to assess an offering's novelty indicator; and general advice on a course of action to enhance the probability of a sales win.

In operation of an example embodiment of system 10, an offering may be identified. One or more characteristics of the offering may be determined. In certain embodiments, the one or more characteristics of the offering may be determined using a questionnaire of one or more weighted questions 22. Analysis module 20 may determine a novelty indicator for the offering. For example, analysis module 20 may determine the novelty indicator for the offering based on the one or more characteristics of the offering (e.g., based on the responses to the one or more questions of the questionnaire). In certain embodiments, analysis module 20 may determine the novelty indicator for the offering by computing a numeric novelty index for the offering, the numeric novelty index quantifying the level of innovation of the offering. Analysis module 20 may determine a novelty group for the offering based on the determined novelty index, the novelty indicator comprising the novelty group. Analysis module 20 or another suitable component of system 10 may store the determined novelty indicator in database 18 (identified in FIG. 1 as NI 28) or in another suitable location.

A prospect for the offering may be identified. An innovation perception indicator for the prospect may be determined. Various techniques may be used for determining the innovation perception indicator for the prospect. For example, the KAI tool may be used to determine a KAI score for the prospect. The KAI score may be scaled such that its value is within a range of 0 to 100. This scaled value may be referred to as the innovation perception indicator for the prospect. Analysis module 20 or another suitable component of system 10 may store the determined innovation perception indicator in database 18 (identified in FIG. 1 as IPI 30) or in another suitable location.

Analysis module 20 may access the novelty indicator for the offering and the innovation perception indicator for the prospect. For example, analysis module 20 may access the stored novelty indicator for the offering (e.g., NI 28 in database 18) and the stored innovation perception indicator for the prospect (e.g., INI 30 in database 18). Analysis module 20 may compare the novelty indicator for the offering with the innovation perception indicator for the prospect to determine if the offering is aligned with the expectations of the prospect. For example, analysis module 20 may compare the novelty index for the offering to the innovation perception indicator for the prospect to determine whether the novelty index and the innovation perception indicator match. Analysis module 20 may communicate a result of the comparison. Based on the results of the comparison, analysis module 20 may provide one or more recommendations. Analysis module 20 may communicate the one or more recommendations to user system 12 or another suitable device for display or other suitable playback.

Particular embodiments of the present invention may provide one or more technical advantages. Conventional techniques for aligning offerings with the expectations of a business prospect typically rely on guesswork and intuition. Previous and existing solutions are typically based on individual performance, are highly subjective, and are non-repeatable—sometimes being nothing more than a wild guess.

Certain embodiments of the present invention increase the probability of winning sales pursuits by quantitatively aligning offerings with the expectations of business prospects. For example, certain embodiments use a personality psychometric (e.g., to determine an innovation perception indicator) to assess a prospect's view of innovation and expectations from an offering, and also quantitatively assess the novelty of an offering. Sales win rates may be increased by best aligning the appropriate offering with the appropriate prospect. Although enhancement of the sales process is primarily described, certain embodiments of the present invention may facilitate intelligent product configuration and custom service offerings. In certain embodiments, the present invention is delivered as an online tool, helping a sales professional to rapidly assess the novelty characteristics of an offering and determine a sales strategy that would maximize the win rate.

According to certain embodiments of the present invention, a scientific analysis of personality types and preferences is used to determine an innovation perception indicator (e.g., a numeric innovation perception index) for a prospect. In certain embodiments, the process for calculating a novelty indicator (e.g., a numeric novelty index) may be checked and validated against empirical data. In certain embodiments, the present invention includes assessing an offering, generating a quantitative representation of the novelty of the offering (e.g., a novelty index for the offering), and facilitating alignment of the novelty of the offering with the expectations of a prospect. When such alignment does not exist, the present invention may provide suggestions regarding how to present the offering in the best light. The recommendations may help deliver the right message to the right prospect by better aligning offerings with prospects, so that the prospects' expectation of innovation (or lack thereof) are properly met, which may lead to winning more sales pursuits.

U.S. Patent Publication No. 2004/0064358 A1 describes, among other things, a technique for quantifying an innovation level of an organization and aligning the innovation level with a strategy. The end result in certain embodiments of that patent publication is a matching of products and services to clients, using Everett Rogers' theory for adoption of technological innovation and invention to identify the organization's technology adoption profile and the provider's products or services that align with it. In certain embodiments, the present invention accounts for the cognitive nature of human bias involved when people assess technological innovation, their own attitude toward technological innovation, or the attitude their peers and workgroups have toward innovation. Additionally or alternatively, in certain embodiments, the present invention addresses the shared bias, or "groupthink," that can occur among people who work in the same industry, company, or environment.

Figure 2:
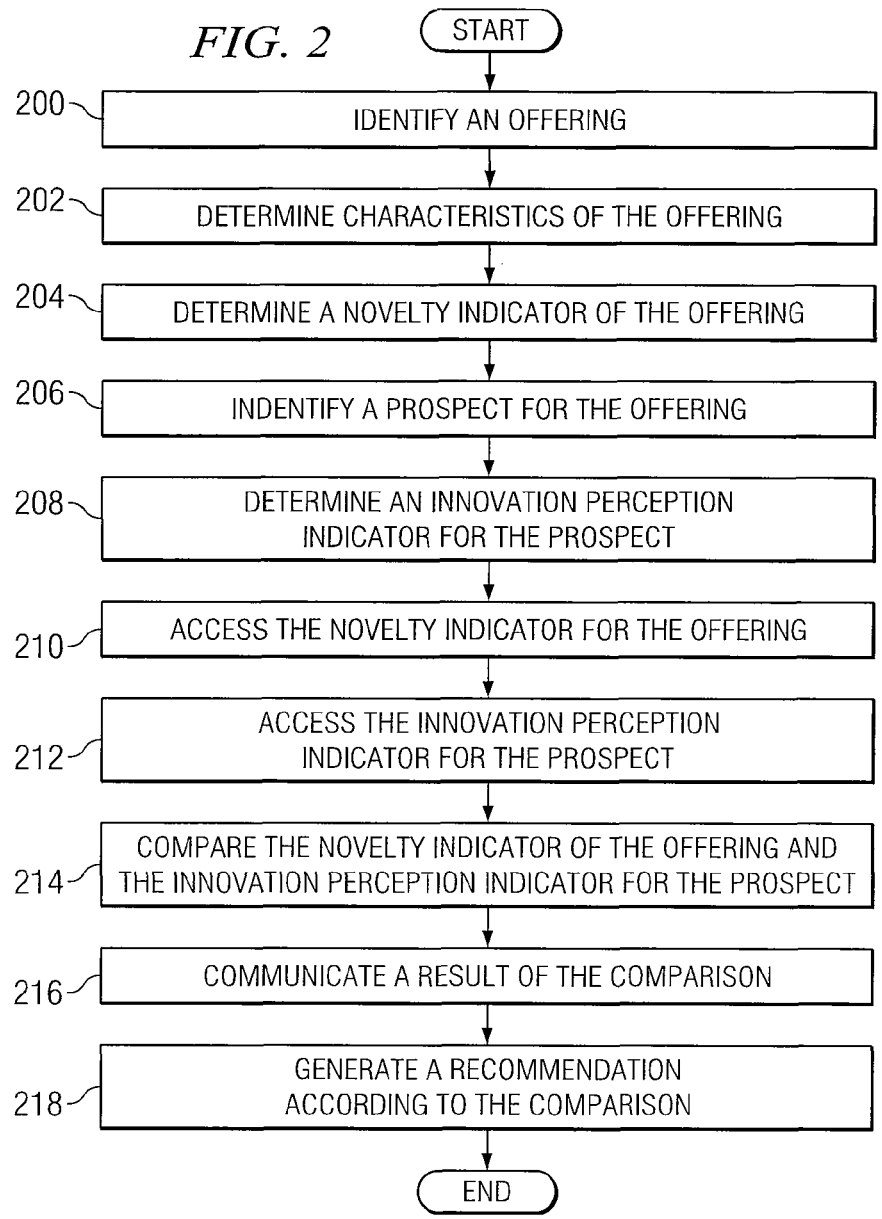
FIG. 2 illustrates an example method for aligning a business offering with the expectations of a business prospect, according to certain embodiments of the present invention.

FIG. 2 illustrates an example method for aligning a business offering with the expectations of a business prospect, according to certain embodiments of the present invention. The method may be implemented in any suitable combination of software, firmware, and hardware, according to particular needs. Although particular components may be identified as performing particular steps, the present invention contemplates any suitable components performing the steps according to particular needs.

At step 200, an offering may be identified. The offering may have been prepared in response to a request for quote (RFQ) or in any other suitable manner. The offering may be for any suitable combination of a product or service, for example.

At step 202, one or more characteristics of the offering may be determined. The one or more characteristics of the offering may be determined in any suitable manner. In certain embodiments, the one or more characteristics of the offering may be determined using a questionnaire of one or more weighted questions 22. As an example, analysis module 20 may retrieve the questionnaire from database 18 (e.g., one or more of weighted questions 22) and may communicate the questionnaire to user system 12 for display. As described above, the questions of the questionnaire may be weighted in a suitable manner. A user of user system 12 may complete the questionnaire and return the results to server system 14 (e.g., to analysis module 20). The completion of the questionnaire may be an interactive process such that responses are communicated to server system 14 as those responses are entered by a user of user system 12, or the responses may be communicated in bulk after the user of user system 12 has answered all of the questions. The responses may be provided in any other suitable manner, according to particular needs. Analysis module 20 may store the responses to the one or more weighted questions 22 of the questionnaire, if appropriate, in database 18. These responses may identify one or more characteristics of the offering.

At step 204, analysis module 20 may determine a novelty indicator for the offering. Analysis module 20 may determine the novelty indicator for the offering based on the one or more characteristics of the offering (e.g., based on the responses to the one or more questions of the questionnaire). In certain embodiments, analysis module 20 may determine the novelty indicator for the offering by computing a numeric novelty index for the offering, the numeric novelty index quantifying the level of innovation of the offering. Analysis module 20 may compute the numeric novelty index for the offering based on the one or more characteristics of the offering, the novelty index quantifying the innovation level of the offering. The one or more characteristics of the offering may be determined according to one or more weighted questions 22 of a questionnaire, the novelty index being determined according to responses to the one or more weighted questions 22. In certain embodiments, analysis module 20 automatically determines the novelty index based on the responses to the one or more weighted questions and the weights of the one or more weighted questions.

Analysis module 20 may determine a novelty group for the offering based on the determined novelty index, the novelty indicator comprising the novelty group. The novelty group may be one of a plurality of possible novelty groups, each novelty group associated with a corresponding range of novelty index values. For example, the novelty continuum may be associated with a range of numeric novelty index values, the range being divided into a number of sub-ranges each associated with a novelty group. As a particular example, the novelty index may be a number in the range of zero to one-hundred. The range may be broken down into five segments (e.g., 0-20, 21-40, and so on). Analysis module 20 may determine the novelty group for the offering by determining a particular range of novelty index values within which the computed novelty index falls and determining that the novelty group for the offering comprises the novelty group that corresponds to the particular range of novelty index values. For example, analysis module 20 may compare the determined novelty index for the offering to the possible ranges of novelty index values, and when the range within which the novelty index falls is determined, set the novelty group for the offering to the novelty category. Analysis module 20 or another suitable component of system 10 may store the determined novelty indicator in database 18 (identified in FIG. 1 as NI 28) or in another suitable location.

At step 206, a prospect for the offering may be identified. As an example, the prospect may be company, individual, group within company, or any other suitable target of the offering.

At step 208, an innovation perception indicator for the prospect may be determined. Various techniques may be used for determining the innovation perception indicator for the prospect. As described above, in certain embodiments, the KAI tool may be used to determine a KAI score for the prospect. The KAI score may be scaled such that its value is within a range of 0 to 100. This scaled value may be referred to as the innovation perception indicator for the prospect. The innovation perception indicator may be determined automatically by analysis tool 20 based on questions answered by a user of user system 12 or the user may simply input a value for the innovation perception indicator after having determined the value manually. Analysis module 20 or another suitable component of system 10 may store the determined innovation perception indicator in database 18 (identified in FIG. 1 as IPI 30) or in another suitable location.

At step 210, analysis module 20 may access the novelty indicator for the offering. Analysis module 20 may access the novelty indicator in any suitable manner, according to particular needs. For example, analysis module 20 may access the stored novelty indicator for the offering (e.g., NI 28 in database 18). At step 212, analysis module 20 may access the innovation perception indicator for the prospect. Analysis module 20 may access the innovation perception indicator in any suitable manner, according to particular needs. For example, analysis module 20 may access the stored innovation perception indicator for the prospect (e.g., INI 30 in database 18).

At step 214, analysis module 20 may compare the novelty indicator for the offering with the innovation perception indicator for the prospect to determine if the offering is aligned with the expectations of the prospect. For example, analysis module 20 may compare the novelty index for the offering to the innovation perception indicator for the prospect to determine whether the novelty index and the innovation perception indicator match. It should be understood that a "match" may include both a match of exact equivalence (e.g., a novelty indicator of 40 and an innovation perception indicator of 40) or a match within a suitable range of values. If analysis module 20 determines that the novelty indicator for the offering matches the innovation perception indicator for the prospect, then analysis module 20 may determine that the offering is aligned with the expectations of the prospect.

As described above, the novelty indictor for an offering may be a novelty group determined based on a computed novelty index. To simplify the comparison process, database 18 may store associations of innovation perception indictors with particular novelty groups. Based on the determined innovation perception indicator for a particular prospect, analysis module 20 may determine whether the determined innovation perception indicator is one that is associated with the determined novelty group for the offering. Another way to view this comparison is that analysis module 20 may determine whether the novelty group of the offering is associated with the determined innovation perception indicator for the prospect. If the determined innovation perception indicator for the prospect is associated with the novelty group of the offering, then analysis module 20 may determine that the offering matches the prospect's expectations. On the other hand, if the determined innovation perception indicator for the prospect is not associated with the novelty group of the offering, then analysis module 20 may determine that the offering does not match the prospect's expectations.

The alignment of the offering with the expectations of the prospect may leverage the fact that people with different innovation perception indicators gravitate toward different solutions and may interpret or perceive the innovation level of an offering differently. Theoretically, the comparison performed by analysis module 20 aligns the adaptive end of the innovation perception indicator scale (e.g., the KAI scale) with the optimization end of the novelty indicator continuum and aligns the innovative end of the innovation perception indicator scale (e.g., the KAI scale) with the transformative end of the novelty indicator continuum. In an ideal situation, an offering is presented to a prospect when the offering is aligned with the expectations of a business prospect.

At step 216, analysis module 20 may communicate a result of the comparison. For example, if the novelty indicator for the offering is determined to match the innovation perception indicator for the prospect, then the result communicated by analysis module 20 may indicate that the offering is aligned with the expectations of a business prospect. As another example, if the novelty indicator for the offering is determined not to match the innovation perception indicator for the prospect, then the result communicated by analysis module 20 may indicate that the offering is not aligned with the expectations of a business prospect.

At step 218, based on the results of the comparison, analysis module may provide one or more recommendations. Analysis module 20 may communicate the one or more recommendations to user system 12 or another suitable device for display or other suitable playback. It is often the case that one or more persons associated with the enterprise providing the offering may use embodiments of the present invention in preparing for a presentation regarding the offering to one or more prospects. The recommendations provided by analysis module 20 may provide advice regarding such a presentation.

Recommendations may or may not be pre-generated and stored in database 18. In certain embodiments, a set of recommendations is pre-stored for each novelty group, including what to do if a prospect's innovation perception indicator is determined by analysis module 20 to be too low or too high for the novelty indicator (e.g., novelty group). The recommendations may include any suitable suggestions, including inviting one or more other prospect's to a meeting regarding the offering (e.g., another member of the prospect's team who has a closer innovation perception indicator), what aspect(s)

of the offering to emphasis, and even what additional offerings should be used to augment or replace the initial offering.

For example, if analysis module 20 determines that the offering matches the expectations of the prospect, analysis module 20 may provide a first set of recommendations. Recommendations provided in the case of a match may include general recommendations as to features of the offering to emphasize, particular recommendations as to features of the offering to emphasize, the length of the presentation, advantages of the offering to emphasize, or any other suitable recommendations.

Recommendations may be generated based on various case templates 26, and the knowledge of the prospect or audience's innovation perception indicator. For example, case templates 26 may provide pre-scripted text for addressing certain novelty indicators, innovation perception indicators, and relationships between the novelty indicator and innovation perception indicator. Finally, the ideal prospect or audience may be identified along with specific recommendations for the sales strategy. The recommendation may include an indication of an ideal audience.

FIGS. 3A-3D illustrate an example questionnaire 300 that may be used to determine the one or more characteristics of the offering for determining the novelty indicator for the offering, according to certain embodiments of the present invention. Questionnaire 300 includes a number of weighted questions 302, which may be selected from weighted questions 22 described above with reference to FIG. 1. The particular format of questionnaire 300 is merely an example.

Questions 302 of questionnaire 300 may be designed to capture the novelty and adaptiveness of offerings as a function of time, technology maturity, and market maturity. For example, an offering directed to a replacement phone system with no new features, but offered at a lower price may be considered more of an adaptive or optimizing solution; whereas, another offering directed to using nanotechnology embedded in apparel to deliver music to the user (thus creating a completely new market) may be considered more of an innovative offering.

The questions may be divided into the general categories 304, such as Environment, Novelty, Obviousness, and Utility. For example, the Environment category may refer to the potential impact of the offering. As another example, the Novelty category may refer to the newness or oldness of the core of the offering. As another example, the Obviousness category may refer to how it is to derive the offering from existing solutions. As another example, the Utility category may refer to how and in what mode the offering is used. These general categories 304 may have sub-categories 306, as shown in FIGS. 3A and 3C. The particular categories 304 and sub-categories 306 shown in FIGS. 3A and 3C are merely examples.

In this example, each question 302 has two or more possible answers or responses 308. In the illustrated example, each question 302 is listed once for each possible response 308 to the question. The novelty continuum on which the innovation level of the offering is rated may be associated with a numeric range (e.g., from 1, indicating absolute optimization, to 100, indicating absolute transformation). In certain embodiments, the novelty index is a number in the range of 0 to 100, where 0 implies an offering of the highest degree of optimization (lacking any innovation), and 100 implies an extremely novel solution. Based on responses 308 to questions 302 of questionnaire 300, a numeric novelty index may be computed for the offering being evaluated. This novelty index may be in the range of one to one hundred, indicating where on the novelty continuum the offering falls.

According to this example, a lower novelty index indicates that the offering is more of an optimizing offering; whereas, a higher novelty index indicates that the offering is more of a transformative offering. For example, an offering with a novelty index of 35 may be a commodity solution attempting to optimize a process, such as cost, but lacks much innovation. An offering with a novelty index of 85 is typically a higher-risk offering that may attempt to create a new market and incorporates advanced technologies. The value of the offering novelty index is expected to change with time, and frequent assessment of the index may be appropriate as the market matures.

In certain embodiments, questions 302 of questionnaire 300 are weighted with one or more weights 310. For example, each possible answer 308 for a question 302 may be assigned a particular weight 310. In the illustrated example, question number one ("How much will the implementation of this offering impact the clients' current processes?") has three possible answers 308—Low, Moderate, and High. The answer Low is assigned a weight 310 of negative one, the answer Moderate is assigned a weight 310 of one, and the answer High is assigned a weight 310 of three. A weight 310 may be a positive value (excitatory) or a negative value (inhibitory). A weight 310 signifies the contribution of an answer to a question toward the novelty index. In certain embodiments, a higher value indicates a greater shift toward transformative innovation, and a lower value indicates a shift toward optimizing innovation. As described in more detail below with reference to FIG. 4, weights 310 may be determined via controlled testing of known offerings and statistical analysis of the responses by a statistically valid population. As an example, the test may include ten test cases (with known transformative or optimizing properties), each representing an offering. Sixteen experienced individuals may be asked to review the test cases and respond to the questions. The number of questions and the weights 310 may be determined by analyzing the consistency of the responses to the test cases, where an answer that is consistently given by more reviewers is given a higher or lower weight, depending on the transformative or optimizing nature of the test case. Questions that produce inconsistent answers may be given weight 310 values closer to zero, and questions that are answered very inconsistently may be dropped.

Each weight 310 has an associated adjusted weight 312. The purpose of adjusted weight 312 may be to ensure that the computed novelty index is within the range 1 to 100. In certain embodiments, the present invention produces a number between 0 and 100 for the novelty index, based on the responses to the questions. To compute this value, the novelty index may be initialized to 50, and weights (determined according to the user's answers) may be added or subtracted to or from the novelty index, thus raising or lowering the novelty index as each question is answered. Mathematically, weights 310 will not ensure that the novelty index remains in the range 0 to 100; therefore, adjusted weights 312 may be calculated to ensure that the novelty index remains in the range 0 to 100, capturing the relative contribution of each response to the overall novelty index. As an example, this adjustment may be accomplished by multiplying each excitatory and inhibitory weight by correction factors as follows:

$$\text{Excitatory Correction Factor} = \sum \frac{50}{(ExcitatoryWeights)}$$

$$\text{Inhibitory Correction Factor} = \sum \frac{50}{(InhibitoryWeights)}$$

In certain embodiments, to compute adjusted weights 312, optimizing 314 and transformative 316 values may be used where optimizing 314 only lists the most negative weight for each question's weight 310, and transformative 316 only lists the most positive weight for each question's weight 310. Otherwise, the values in 314 and 316 may be recorded as zero. In this example, the sum of the data in optimizing 314 column is noted at the bottom of questionnaire 300 (i.e., 47), and similarly the sum of the data in transformative 316 is noted at the bottom (i.e., 56). These sums represent the range of values that the sum of weights 310 can represent in the most extreme cases. These sums may be used to adjust weights 310 and to compute the adjusted weight 312. To do this, in certain embodiments, adjusted weight 312 is calculated as follows:

For each question:
If weights 310 is greater than 0, then Adjusted Weight=Weight/(Sum of Transformative column)/50; and
If Weights 310 is less than 0, then Adjusted Weight=Weight/(Sum of Optimizing column)/50
For example, for question one, the following is true:
Answer 1, where Weight=−1, then Adjusted Weight=−1/47*50=−1.06;
Answer 2, where Weight=1, then Adjusted Weight=1/56*50=0.89; and
Answer 3, where Weight=3, then Adjusted Weight=3/56*50=2.68.

The above-described technique provides an example of approaches that ensure that the novelty index remains within the range 0 to 100 regardless of how questions 302 are answered. To test this premise, columns negative 318 and positive 320 test the most extreme cases by listing the lowest (most optimizing) and highest (most transformative) responses. The sum of these columns (i.e., for negative 318 and positive 320) are −50 and 50. Since the calculation of the novelty index is initiated at 50 in this example, then in the most optimizing case 50−50=0 and in the most transformative case 50+50=100.

Figure 4:
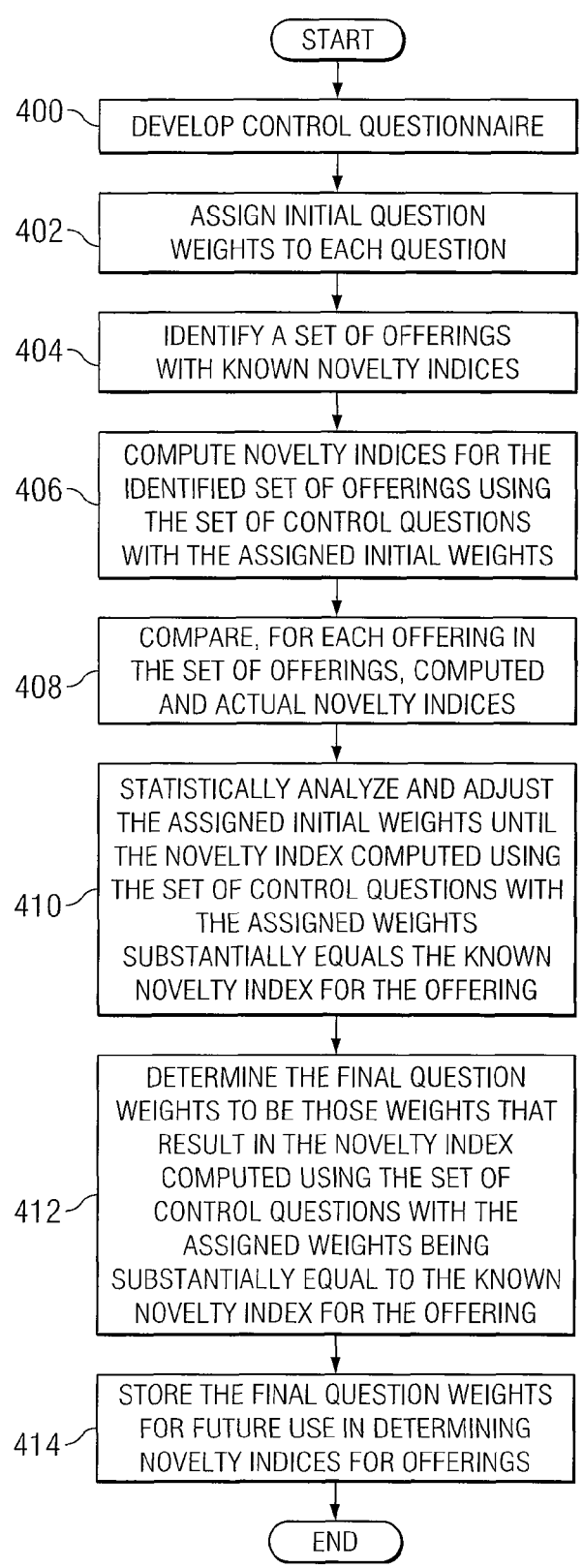
FIG. 4 illustrates an example method for determining appropriate weights for questions for identifying one or more characteristics of an offering and determining the novelty index of the offering, according to certain embodiments of the present invention.

FIG. 4 illustrates an example method for determining appropriate weights 310 for questions 302 for identifying one or more characteristics of an offering and determining the novelty index of the offering, according to certain embodiments of the present invention. The method may be implemented in any suitable combination of software, firmware, and hardware, according to particular needs. Although particular components may be identified as performing particular steps, the present invention contemplates any suitable components performing the steps according to particular needs.

As described above, this novelty index may be used to determine a novelty indicator for the offering. In certain embodiments, questions 302 and their associated weights 310 may be determined before system 10 is put into use for aligning an offering with the expectations of a business prospect and may be applied across a variety of offerings. Weights 310 may be determined via controlled testing of known offerings and statistical analysis of the responses by a statistically valid population. The tested population may include persons with known KAI scores. The KAI scores may be used to correct the determination of weights 310 to avoid any personal biases.

At step 400, a set of control questions may be developed. At step 402, initial weights may be assigned to each question. For example, a weight may be assigned to each response to each question. As described above, a weight may be a positive value (excitatory) or a negative value (inhibitory). At step 404, a set of offerings, each with a corresponding known novelty index, may be identified. For example, data regarding a set of such offerings may be stored in database 18 or another suitable location. For example, the novelty index could be manually calculated using example questions 302 shown in FIGS. 3A-3D. At step 406, the novelty indices for the identified set of offerings may be computed using the set of control questions with the assigned initial weights. At step 408, for each offering in the set of offerings, the novelty index computed using the set of control questions with the assigned initial weights may be compared with the known novelty index for the offering.

At step 410, the assigned initial weights may be statistically analyzed and adjusted until the novelty index computed using the set of control questions with the assigned weights substantially equals the known novelty index for the offering. At step 412, the final question weights are determined to be those weights that result in the novelty index computed using the set of control questions with the assigned weights being substantially equal to the known novelty index for the offering. At step 414, the final question weights may be stored for future use in determining novelty indices for offerings. For example, the final question weights may be stored in database 18.

Figure 5:
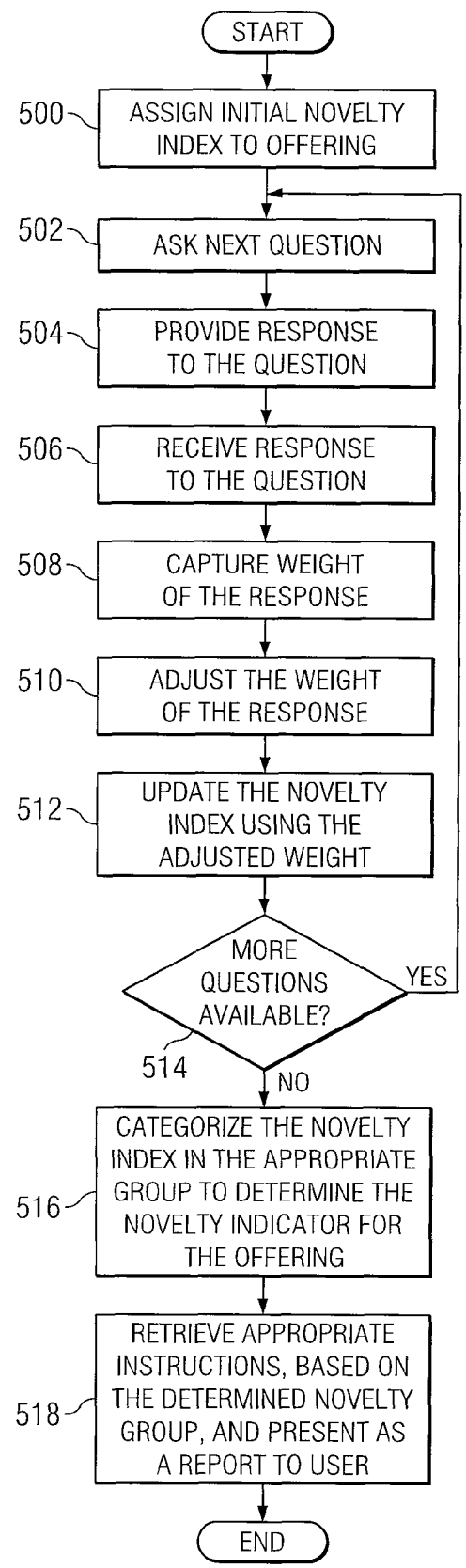
FIG. 5 illustrates an example method for determining a novelty indicator for an offering, according to certain embodiments of the present invention.

FIG. 5 illustrates an example method for determining a novelty indicator for an offering, according to certain embodiments of the present invention. The method may be implemented in any suitable combination of software, firmware, and hardware, according to particular needs. Although particular components may be identified as performing particular steps, the present invention contemplates any suitable components performing the steps according to particular needs. This method may be performed at run time.

At step 500, an offering may be assigned an initial novelty index. For purposes of this example, assume that the initial novelty index assigned to the offering is 50. At step 502, the next question may be asked. For example, analysis module 20 may present the next question to user system 12, or the user of user system 12 may simply view the next question on a complete questionnaire previously sent to user system 12. At step 504, user system 12 may provide a response (e.g., a response 308) to the question (e.g., a question 302). At step 506, analysis module 20 may receive the response 308 to the question. At step 508, analysis module 20 may capture the weight 310 of the response 308. For example, if user system 12 provides the answer 308 Moderate to question 302 number one in FIGS. 3A-3D, analysis module may capture the weight 1.

At step 510, the weight 310 of the response 308 may be adjusted. For example, the adjusted question weight may be computed. In certain embodiments, it may be appropriate to adjust the weights 310 to ensure that the novelty index remains in the range 0 to 100. As an example, this adjustment may be accomplished by multiplying each excitatory and inhibitory weight by correction factors as follows:

$$\text{Excitatory Correction Factor} = \sum \frac{50}{(ExcitatoryWeights)}$$

$$\text{Inhibitory Correction Factor} = \sum \frac{50}{(InhibitoryWeights)}$$

At step 512, the novelty index may be updated. For example, the adjusted weighted response may be added to the current novelty index. Thus, in general, in certain embodiments, the novelty index computation beings with the number 50, and then the adjusted weights are either added or subtracted until a final score is calculated. The adjusted weighted response value may be excitatory (which will increase the value of the novelty index), or the adjusted weighted response value may be inhibitory (which will decrease the value of the novelty index).

This cycle of asking questions and updating the novelty index may continue until all questions are asked and answered, if appropriate. For example, at step 514, analysis module 20 may determine if more questions 302 are available to be asked and answered. If analysis module 20 determines at step 514 that there are more questions 302 available, the method may return to step 502 to ask the next question 302. If analysis module 20 determines at step 514 that there are no more questions 302 available, the method may proceed to step 516.

At step 516, the novelty index for the may be categorized in a novelty group to determine the novelty indicator for the offering. In certain embodiments, to determine the novelty group for the offering, the final value of the novelty index may be categorized into ranges such as very Low, Low, Medium, High, and Very High. At step 518, based on the determined novelty group, appropriate instructions may be retrieved and presented as a report to the user. An example report is described below with reference to FIG. 6.

FIG. 6 illustrates an example report novelty category report 600, according to certain embodiments of the present invention. A novelty category report may be pre-generated and stored for each novelty group. Novelty category report 600 is for the novelty group "Very Low," as indicated at reference numeral 602. As shown at reference numeral 604, novelty category report 600 may include a summary of typical characteristics of offerings in the determined novelty group (e.g., Very Low, in this example). As shown at reference numeral 606, novelty category report 600 may include a description of the type of prospect that would be a good prospect for offerings in the determined novelty group. As shown at reference numeral 608, novelty category report 600 may include a description of what to do if a prospect's innovation perception indicator (e.g., KAI score) is a good match for an offering in this novelty group. As shown at reference numeral 610, novelty category report 600 may include a description of what to do if particular prospect's innovation perception indicator (e.g., KAI score) is too low for an offering in this novelty group. As shown at reference numeral 612, novelty category report 600 may include a description of what to do if particular prospect's innovation perception indicator (e.g., KAI score) is too high for an offering in this novelty group.

FIG. 7 illustrates an example KAI scale 700, which may be used to determine the innovation perception indicator for a prospect according to certain embodiments of the present invention. In this particular example, KAI scale 700 ranges numerically from 32 (at endpoint 702 of scale 700) to 160 (at endpoint 704 of scale 700) and reflects the prospect's problem-solving and creativity style. The majority of the population is believed to fall in the range 64 (as indicated at reference point 706) to 112 (as indicated at reference point 708), with a mid-point 96 (as indicated at reference point 710). The lower numbers indicate an adaptive style for problem-solving and creativity style, where the solutions are typically "within the box." The higher numbers indicate an innovative style for problem-solving and creativity style, where the solutions are typically "outside the box." For this example, a KAI score of 32 is the most "adaptive" score possible, and a KAI score of 160 indicates the most "innovative" score possible. Thus, in this example, KAI scores closer to 32 indicate a more adaptive personality, and KAI scores closer to 160 indicate a more innovative personality.

An adaptive personality may be described as an optimizer. In certain embodiments, a prospect who is more adaptive may have one or more of the following characteristics: creative inside the box; prefers incremental change; attempts to do something better rather than different (e.g., building a better mousetrap); attempts to cut existing costs; seeks execution in the near term; and any other suitable adaptive characteristics. An adaptive prospect may examine a particular offering and remark, "This is not innovation. This is a total departure from the way we have always done things."

An innovative personality may be described as a transformer. In certain embodiments, a prospect who is more innovative may have one or more of the following characteristics: creative outside the box; prefers disruptive change; attempts to do something different (e.g., get a cat, rather then just improve the existing mousetrap); attempts to find new sources of revenue; seeks vision for tomorrow; and any other suitable innovative characteristics. An innovative prospect may examine a particular offering and remark, "This is not innovation. This is just a gradual improvement in the way things have always been done."

TABLE 2, below, provides example behaviors based on the KAI scale, according to certain embodiments of the present invention. The example behaviors provided in TABLE 2 are for example purposes only.

TABLE 2

| ADAPTERS - Low KAI (32-96) | INNOVATORS - High KAI (96-160) |
| --- | --- |
| Efficient, thorough, adaptable, methodical, organized, precise, reliable, dependable | Ingenious, original, independent, unconventional, unpredictable |
| Accepts problem definition | Challenges problem definition |
| Does things better | Does things differently |
| Concerned with resolving problems rather than finding them | Discovers problems and avenues for their solutions |
| Seeks solutions to problems in tried and understood ways | Manipulates problems by questioning existing assumptions |
| Reduces problems by improvement and greater efficiency, while aiming at continuity and stability | Is catalyst to unsettled groups, irreverent of their consensual views |
| Seems impervious to boredom; able to maintain high accuracy in long spells of detailed work | Capable of routine work for only short bursts; quick to delegate routine tasks |
| Is an authority within established structures | Tends to take control in unstructured situations |

FIGS. 8A-8C illustrate an example KAI estimation table 800 that may be used to estimate the KAI score of a prospect, according to certain embodiments of the present invention. In the illustrated example, the KAI scores (ranging from 32 to 160) are subdivided into eleven sub-ranges (32-58, 59-67, 68-75, 76-85, 86-93, 94-99, 100-105, 106-116, 117-125, 126-137, and 138-160). This particular subdivision of the KAI score range is for example purposes only. Each sub-range is associated with a number of characteristics/personality traits, some of which are characterized as advantages and some of which are characterized as disadvantages.

To estimate the characteristics of a prospect, various characteristics of a prospect may be known or suspected, and those characteristics may be mapped to corresponding characteristics on KAI estimation table 800. The appropriate KAI score for the prospect will be the KAI score associated with the corresponding characteristics in KAI estimation table 800. For cases in which a prospects exhibits characteristics from multiple KAI score categories, the appropriate KAI score may be the range that most closely corresponds to the prospect's characteristics.

Figure 9:
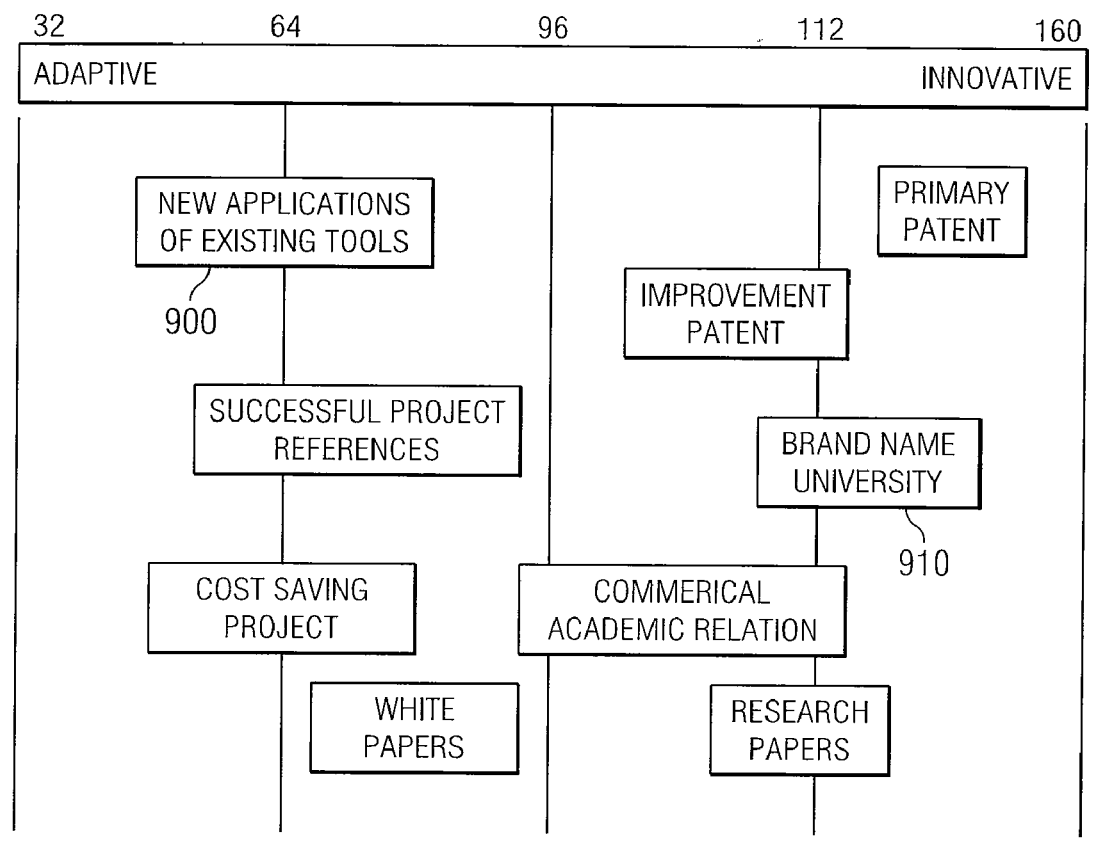
FIG. 9 illustrates an example of how various offerings might by aligned with certain KAI scores along the KAI scale.

FIG. 9 illustrates an example of how various offerings might by aligned with certain KAI scores along the KAI scale. For example, a new application of an existing tool (i.e., as indicated at reference numeral 900) may be aligned with a prospect having a relatively low KAI score, and the inclusion of a brand name university such as MIT (i.e., as indicated at reference numeral 910) in the offering may be aligned with a prospect having a relatively high KAI score.

Although particular methods have been described with reference to FIGS. 2 and 4-5, the present invention contemplates any suitable methods in accordance with the present invention. Thus, certain of the steps described with reference to FIGS. 2 and 4-5 may take place substantially simultaneously and/or in different orders than as shown and described. Moreover, components of system 10 may use methods with additional steps, fewer steps, and/or different steps, so long as the methods remain appropriate.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for quantitative alignment of business offerings with the expectations of a business prospect, comprising:
    with a processor, accessing a novelty indicator for an offering, the novelty indicator being based on one or more characteristics of the offering and rating an innovation level of the offering, in which the novelty indicator for the offering is determined by computing a numeric novelty index for the offering, the novelty index quantifying the innovation level of the offering;
    with a processor, determining a novelty group based on the determined novelty index by determining a particular range of novelty index values within which the computed novelty index falls and determining that the novelty group for the offering comprises the novelty group that corresponds to the particular range of novelty index values;
        in which the novelty indicator comprises the novelty group and in which the novelty group is one of a plurality of novelty groups, each novelty group associated with a corresponding range of novelty index values;
    with a processor, accessing an innovation perception indicator for a prospect of the offering, the innovation perception indicator providing an indication of how the prospect views innovation; and
    with a processor, comparing the novelty indicator for the offering with the innovation perception indicator for the prospect to determine if the offering is aligned with the expectations of the prospect.

2. The method of claim 1, wherein the one or more characteristics of the offering are determined according to a questionnaire comprising one or more weighted questions, the novelty index being determined according to responses to the one or more weighted questions of the questionnaire.

3. The method of claim 2, comprising:
    initiating display of the one or more weighted questions of the questionnaire;
    receiving responses to the one or more weighted questions; and
    automatically determining the novelty index based on the responses to the one or more weighted questions and the weights of the one or more weighted questions.

4. The method of claim 1, wherein:
    the innovation perception indicator for the prospect is determined using the Kirton Adaptation-Innovation Inventory (KAI) tool; and
    the method comprises determining a KAI score for the prospect, the innovation perception indicator for the prospect comprising the KAI score determined for the prospect.

5. The method of claim 4, wherein the KAI score is estimated based on one or more determined personality traits of the prospect.

6. The method of claim 1, comprising generating a recommendation based on the comparison of the novelty indicator for the offering and the innovation perception indicator for the prospect.

7. A computer program product for quantitative alignment of business offerings with the expectations of a business prospect, the computer program product being embodied in a computer-readable storage medium having computer usable program code embodied therewith, the computer usable program code, when executed, being operable to:
    access a novelty indicator for an offering, the novelty indicator being based on one or more characteristics of the offering and rating an innovation level of the offering, in which the novelty indicator for the offering is determined by computing a numeric novelty index for the offering, the novelty index quantifying the innovation level of the offering;
    determine a novelty group based on the determined novelty index by determining a particular range of novelty index values within which the computed novelty index falls and determining that the novelty group for the offering comprises the novelty group that corresponds to the particular range of novelty index values;
        in which the novelty indicator comprises the novelty group and in which the novelty group is one of a plurality of novelty groups, each novelty group associated with a corresponding range of novelty index values;
    access an innovation perception indicator for a prospect of the offering, the innovation perception indicator providing an indication of how the prospect views innovation; and
    compare the novelty indicator for the offering with the innovation perception indicator for the prospect to determine if the offering is aligned with the expectations of the prospect.

8. The computer program product of claim 7, wherein the one or more characteristics of the offering are determined according to a questionnaire comprising one or more weighted questions, the novelty index being determined according to responses to the one or more weighted questions of the questionnaire.

9. The computer program product of claim 8, operable to:
    initiate display of the one or more weighted questions of the questionnaire;
    receive responses to the one or more weighted questions; and
    automatically determine the novelty index based on the responses to the one or more weighted questions and the weights of the one or more weighted questions.

10. The computer program product of claim 7, wherein:
the innovation perception indicator for the prospect is determined using the Kirton Adaptation-Innovation Inventory (KAI) tool; and
the software is operable to determine a KAI score for the prospect, the innovation perception indicator for the prospect comprising the KAI score determined for the prospect.

11. The computer program product of claim 10, wherein the KAI score is estimated based on one or more determined personality traits of the prospect.

12. The computer program product of claim 7, operable to generate a recommendation based on the comparison of the novelty indicator for the offering and the innovation perception indicator for the prospect.

13. A system for quantitative alignment of business offerings with the expectations of a business prospect, comprising:
one or more memory modules operable to:
store a novelty indicator for an offering, the novelty indicator being based on one or more characteristics of the offering and rating an innovation level of the offering in which the novelty indicator for the offering is determined by computing a numeric novelty index for the offering, the novelty index quantifying the innovation level of the offering;
determine a novelty group based on the determined novelty index by determining a particular range of novelty index values within which the computed novelty index falls and determining that the novelty group for the offering comprises the novelty group that corresponds to the particular range of novelty index values, in which the novelty indicator comprises the novelty group and in which the novelty group is one of a plurality of novelty groups, each novelty group associated with a corresponding range of novelty index values; and
store an innovation perception indicator for a prospect of the offering, the innovation perception indicator providing an indication of how the prospect views innovation; and
one or more processing units operable to:
access the novelty indicator for the offering;
access the innovation perception indicator for the prospect of the offering; and
compare the novelty indicator for the offering with the innovation perception indicator for the prospect to determine if the offering is aligned with the expectations of the prospect.

14. The system of claim 13, wherein the one or more characteristics of the offering are determined according to a questionnaire comprising one or more weighted questions, the novelty index being determined according to responses to the one or more weighted questions of the questionnaire.

15. The system of claim 14, wherein the one or more processing units are operable to:
initiate display of the one or more weighted questions of the questionnaire;
receive responses to the one or more weighted questions; and
automatically determine the novelty index based on the responses to the one or more weighted questions and the weights of the one or more weighted questions.

16. The system of claim 13, wherein:
the innovation perception indicator for the prospect is determined using the Kirton Adaptation-Innovation Inventory (KAI) tool; and
the one or more processing units are operable to determine a KAI score for the prospect, the innovation perception indicator for the prospect comprising the KAI score determined for the prospect.

17. The system of claim 16, wherein the KAI score is estimated based on one or more determined personality traits of the prospect.

18. The system of claim 13, wherein the one or more processing units are operable to generate a recommendation based on the comparison of the novelty indicator for the offering and the innovation perception indicator for the prospect.

\* \* \* \* \*